United States Patent [19]
Kanda

[11] Patent Number: 5,930,446
[45] Date of Patent: Jul. 27, 1999

[54] EDITION SYSTEM

[75] Inventor: Takeshi Kanda, Tokyo, Japan

[73] Assignee: Sony Corporation, Tokyo, Japan

[21] Appl. No.: 08/750,330

[22] PCT Filed: Apr. 8, 1996

[86] PCT No.: PCT/JP96/00963

§ 371 Date: Jan. 14, 1997

§ 102(e) Date: Jan. 14, 1997

[87] PCT Pub. No.: WO96/32722

PCT Pub. Date: Oct. 17, 1996

[30] Foreign Application Priority Data

Apr. 8, 1995 [JP] Japan ................................. 7-108217

[51] Int. Cl.$^6$ ........................................... H04N 5/93
[52] U.S. Cl. ........................ 386/52; 386/55; 386/125; 345/327
[58] Field of Search ................................. 345/302, 327, 345/328, 511; 348/552; 386/52, 54, 55, 4, 124, 125; 360/13; H04N 5/93

[56] References Cited

U.S. PATENT DOCUMENTS

| | | | |
|---|---|---|---|
| 4,717,971 | 1/1988 | Sawyer | 358/342 |
| 4,974,178 | 11/1990 | Izeki et al. | |
| 5,206,929 | 4/1993 | Langford et al. | 395/159 |
| 5,237,648 | 8/1993 | Mills et al. | 395/133 |
| 5,339,393 | 8/1994 | Duffy et al. | 395/161 |
| 5,388,197 | 2/1995 | Rayner | 395/154 |
| 5,404,316 | 4/1995 | Klingler et al. | 364/514 |
| 5,469,270 | 11/1995 | Yamamoto | 358/335 |
| 5,471,452 | 11/1995 | Kishi | 369/83 |
| 5,517,320 | 5/1996 | Schuler | 358/335 |
| 5,568,275 | 10/1996 | Norton et al. | 386/52 |
| 5,659,793 | 8/1997 | Escobar et al. | 395/807 |

FOREIGN PATENT DOCUMENTS

| | | |
|---|---|---|
| A3 268270 | 5/1988 | European Pat. Off. |
| 1-94583 | 4/1989 | Japan. |
| 4-344975 | 12/1992 | Japan. |
| 5-342267 | 12/1993 | Japan. |

OTHER PUBLICATIONS

Tonomura et al., Content Visual Interface Using Video Icons for Visual Database Systems, 1990 Acedemin Press Limited pp. 183–198.

Primary Examiner—Wendy Garber
Assistant Examiner—Vincent F. Boccio
Attorney, Agent, or Firm—Frommer Lawrence & Haug, LLP; William S. Frommer; Dennis M. Smid

[57] ABSTRACT

As a recording and reproducing apparatus, synchronized recording and reproducing apparatus which can be simultaneously performed a recording operation for recording a video signal and/or an audio signal inputted via a transmission channel on a recording medium and a reproducing operation for reproducing the video signal and/or the audio signal recorded on the recording medium in parallel is controlled in communication with a controller. In addition, an instruction concerning the recording operation and the reproducing operation is inputted via a graphic user interface. Consequently, the edition work can be carried out along with the recording operation, and the operation state can be visually grasped and the management of the system is made easy.

110 Claims, 12 Drawing Sheets

1ST MANAGEMENT RECORD DATA
(FOR CLIP DATA, EVENT DATA AND PROGRAM DATA)

| CONTENTS OF DATA | NUMBER OF BYTES |
|---|---|
| POINTER TO PRECEDING LINKED DATA | 4 |
| POINTER TO FOLLOWING LINKED DATA | 4 |
| HORIZONTAL DISPLAY SIZE FOR 1 PAGE | 2 |
| VERTICAL DISPLAY SIZE FOR 1 PAGE | 2 |
| DISPLAY POSITION ON SCREEN | 2 |
| HEAD DISPLAY POSITION | 2 |
| TOTAL NUMBER OF LINKS | 2 |

FIG. 4

2ND MANAGEMENT RECORD DATA
(FOR CLIP DATA)

| CONTENTS OF DATA | NUMBER OF BYTES |
|---|---|
| POINTER TO PRECEDING LINKED DATA | 4 |
| POINTER TO FOLLOWING LINKED DATA | 4 |
| ATTRIBUTE | 1 |
| CLIP IMAGE DATA HANDLE | 4 |
| CLIP TYPE | 2 |
| TIME CODE DATA | 4 |
| INDEX NUMBER OF CLIP IMAGE DATA | 4 |

FIG. 5

2ND MANAGEMENT RECORD DATA
(FOR EVENT DATA AND PROGRAM DATA)

| CONTENTS OF DATA | NUMBER OF BYTES |
| --- | --- |
| POINTER TO PRECEDING LINKED DATA | 4 |
| POINTER TO FOLLOWING LINKED DATA | 4 |
| ATTRIBUTE | 1 |
| EVENT NUMBER | 2 |
| TITLE | 16 |
| SUBTITLE | 20 |
| CLIP IMAGE DATA HANDLE OF IN-POINT | 4 |
| CLIP TYPE OF IN-POINT | 2 |
| TIME CODE DATA OF IN-POINT | 4 |
| INDEX NUMBER OF CLIP IMAGE DATA OF IN-POINT | 4 |
| CLIP IMAGE DATA HANDLE OF OUT-POINT | 4 |
| CLIP TYPE OF OUT-POINT | 2 |
| TIME CODE DATA OF OUT-POINT | 4 |
| INDEX NUMBER OF CLIP IMAGE DATA OF OUT-POINT | 4 |
| SLOW TYPE | 2 |
| SYMBOL TYPE | 2 |
| TIME CODE DATA OF SYMBOL | 4 |

FIG. 6

| MARKING | IN | IN | OUT | IN | OUT | IN | IN | IN | OUT | IN | OUT | IN | IN | IN | IN |
|---|---|---|---|---|---|---|---|---|---|---|---|---|---|---|---|
| INDEX No. | 1 | 2 | 3 | 4 | 5 | 6 | 7 | 8 | 9 | 10 | 11 | 12 | 13 | 14 | 15 |
| CLIP No. | 1 | | | | | 6 | 7 | | | | | 12 | 13 | 14 | |
| EVENT No. | | 1 | 1 | 2 | 2 | | | 3 | 3 | 4 | 4 | | | | |

EDITION SYSTEM

DESCRIPTION

1. Technical Field

This invention relates to an edition system. The invention is suitable for, for example, a system for editing a material required to be reported as soon as possible such as sports and news reports.

2. Background Art

This invention has been made in view of the aforementioned point. The invention is intended to provide an edition system which is capable of realizing a real time edition with a smaller system as compared with the prior art.

Considering the above point, in this invention, an edition system comprising: a main recording and reproducing apparatus comprising, input/output means for receiving input video data inputted at a real time, outputting video data obtained from the input video data as first video data at a real time, and outputting video data reproduced from the recording medium as second video data at a real time, and recording and reproducing means for actually performing the recording operation for recording input video data inputted at a real time on the recording medium simultaneously with the reproducing operation for reproducing the video data recorded on said recording medium at a real time; and a computer comprising display means for displaying a graphic display for a user interface which generates a control command relating to the recording and reproducing operation of said main recording and reproducing apparatus, and the first video data and the second video data which are supplied from said main recording and reproducing apparatus at a real time, and event producing means having a first event producing operation for producing a first event from the first video data by operating the user interface displayed on said display means, and a second event producing operation for producing a second event from the second video data by operating the user interface displayed on said display means, said second event producing operation is performed independently of said first event producing operation, is used, thereby, a high-speed real time edition can be realized.

BRIEF DESCRIPTION OF DRAWINGS

FIG. 4 is a diagram illustrating first management record data for clip data, event data and program data.

FIG. 5 is a diagram illustrating second management record data for clip data.

FIG. 6 is a diagram illustrating second management record data for event data and program data.

FIG. 7 is a diagram showing the marking order of clipped image data, and an index number, a clip number and an event number added thereto in the form of a table.

FIG. 8 is a diagram showing each clipped image data which is displayed in a clip display area 28, an event display area 29 and a program display area 30.

BEST MODE FOR CARRYING OUR THE INVENTION

One embodiment of this invention will be described with reference to the accompanying drawings.

Description of General Structure of Edition System

Figure 1:
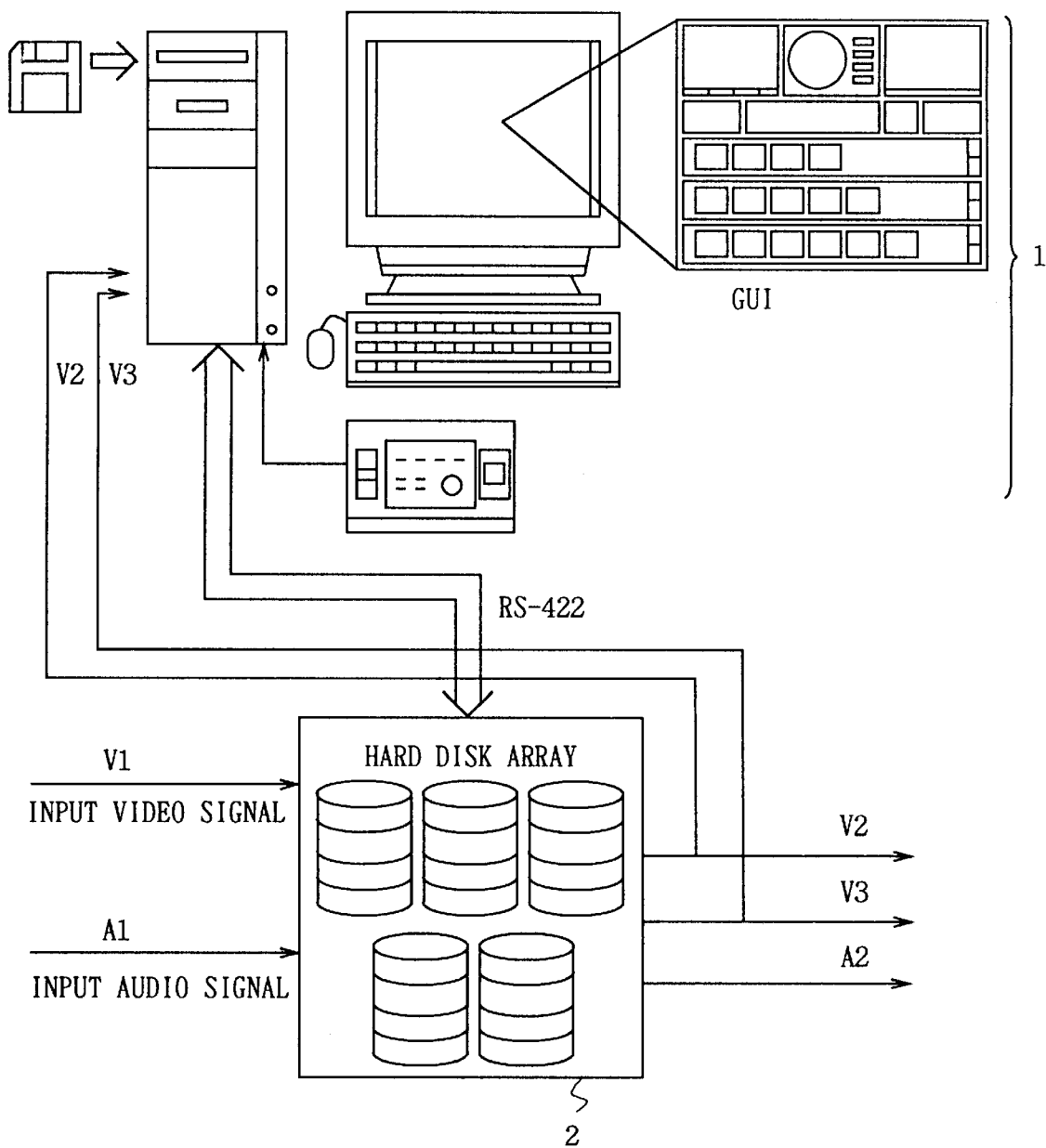
FIG. 1 is a diagram for explaining the general structure of an edition system of this invention.

Accompanying with FIG. 1, the general structure of this edition system will be described. FIG. 1 shows the hardware structure of the whole edition system in the general.

This edition system is composed of a computer 1 and a hard disk array 2. An application program to edit video data which is transmitted to the computer is installed in the computer 1. This application program, installed in the editing computer is a program that is operable under the operating system of the computer. This application program includes a GUI (graphic user interface) to generate a control command.

In the hard disk array 2, plural hard disks are connected on the array. The hard disk array 2 is controlled so that recording and reproducing are performed at the same time outwardly. More specifically, a video signal at a real time can be reproduced from the hard disk while recording the signal.

The computer 1 and the hard disk array 2 are connected with each other with a communication cable according to the communication format of the RS-422 interface. The RS-422 interface communication format is a communication format in which a video signal and a control command can be transmitted/received simultaneously.

The input video signal V1 which is inputted to this edition system is a composite video signal taken by such as a video camera, a composite video signal outputted from a VTR or the like. This composite video signal is a signal to be transmitted according to the SDI (serial digital interface) format. The video signal V2 or V3 which is outputted from this edition system is also a composite video signal to be transmitted according to an SDI format. Of course, the video signal inputted/outputted to/from the edition system may be a component video signal. Simultaneously, the video signal inputted/outputted to/from the edition system is not limited to a digital video signal but may be an analog composite video signal.

The whole operation of this edition system will be described accompanying with FIG. 1. Note that, the detailed description will be done later. The composite video signal taken by such as a video camera is inputted to the computer 1 and the hard disk array 2 respectively. The video signal inputted to the computer 1 is displayed on the monitor of the editing computer 1. On the other hand, the video signal inputted to the hard disk array 2 is encoded at a real time and recorded to a hard disk.

An operator operating the computer 1 can assign an edition point such as an transmitted IN point (edition starting point) and an OUT point (edition end point) by operating a pointing device, for example, a mouse connected to the computer 1. Further, a control command for edition can be generated by using the GUI displayed on the monitor of the computer 1. Thus generated control command is transmitted to the hard disk array 2 as a control command of the RS-422 so as to control reproduction of the hard disk array 2. The reproduced video signal V3 is displayed on the monitor of the computer 1 and outputted to external equipment.

Description of Internal Structure of Computer 1

Figure 2:
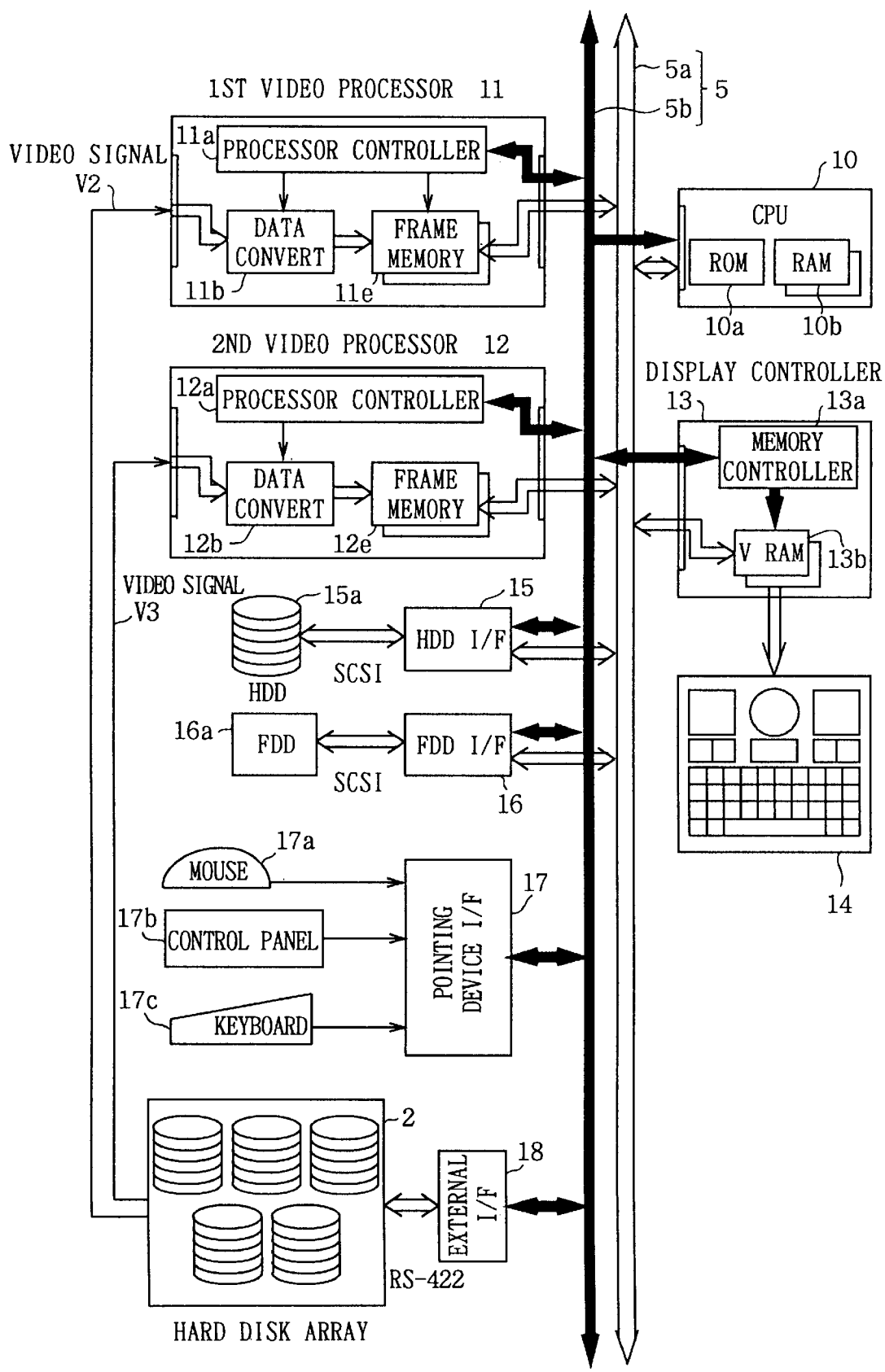
FIG. 2 is a diagram showing the internal structure of a computer 1.

Hereinafter the internal structure of the computer 1 will be described in detail accompanying with FIG. 2. The computer 1 provides a system bus 5 for transmitting a control signal, a video signal and so on, a CPU 10 for controlling the whole of the computer, a first video processor 11 and a second video processor 12 for performing image processing and so on to a video signal, a display controller 13 for controlling a video signal which is displayed on a video monitor 14 and a graphic display for GUI, an HDD interface 15 for controlling a local hard disk drive (local HDD) 15a, an FDD interface 16 for controlling a floppy disk drive 16a, a pointing device interface 17 for generating control data based on the command from a pointing device such as a cursor control device 17a, generally called mouse, a control panel 17b and a keyboard 17c, and an external interface unit 18 providing a software driver for performing data communication according to the RS-422 communication format with the hard disk array 2.

The system bus 5 is a block for performing the communication of video data, command data, address data and so on in the computer 1, and is comprised of: an image data bus 5a for transmitting video data; and a command data bus 5b for transmitting a control signal. The first and second video processors 11 and 12, the display controller 13, the HDD interface 15 and the FDD interface 16 are respectively connected to the image data bus 5a. Thus the first video processor 11, the second video processor 12, the display controller 13, the HDD interface 15 and the FDD interface 16 are connected via the image data bus 5a, and so video data can be transmitted between the blocks. On the other hand, the CPU 10, the first video processor 11, the second video processor 12, the display controller 13, the HDD interface 15, the FDD interface 16, the pointing device interface 17 and the external interface unit 18 are connected to the command data bus 5b. That is, all blocks in the computer 1 is connected via the command data bus 5b.

The CPU 10 is a block to control the whole of the computer. The CPU 10 provides a ROM 10a in which an operating system of the computer 1 has been stored, and a RAM 10b in which an application program recorded on the hard disk 15a is stored by up-loading. If starting up the computer 1, the CPU 10 executes a software program according to the operating system stored in the ROM 10a. Furthermore, if executing an application under this operating system, the CPU 10 reads out the application program which has been recorded on the hard disk of the hard disk drive 15a and up-loads to the RAM 10b in the CPU 10.

The first video processor 11 is a block for receiving and converting the first composite video signal inputted to the computer 1, and temporarily buffering thus converted composite video signal. Concretely, the first video processor 11 comprises a processor controller 11a for controlling the whole of the video processor 11, a data converting unit 11b for converting received analog composite video signal to digital component video data, and a frame memory 11c for temporarily storing the video data for several frames which is outputted from the data converting unit 11b.

The processor controller 11a outputs a control signal for data conversion and a control signal to extract a time code from the composite video signal V2 which has been inputted, to the data converting unit 11b. Further, the processor controller 11a outputs a control signal to control a read/write timing and a read/write address of the frame memory 11c. Concretely, the processor controller 11a controls the read timing of the frame memory so that a time code outputted to a display controller 13 corresponds to video data (frame data).

The data converting unit 11b converts an analog composite video signal to a component video signal on the basis of a control signal from the processor controller 11a, and then converts it to digital video data. At this time, time code data is extracted. The digital-converted video data is outputted to the frame memory 11e and extracted time code is outputted to the processor controller 11a.

Next, the manner of transmission and extraction of the time code will be described. The composite video signal V2 is an analog composite video signal in which a time code has been superimposed in the vertical synchronizing period of the input video signal S1. This time code is a signal inserted in two lines of, 14H and 16H or 12H and 14H in the vertical blanking period, called VITC (vertical interval time code). In this embodiment, a time code generated by a time code generator which synchronizes with an external on air system is used as this time code, however, a time code generated by an internal generator may be used by providing the time code generator in a hard disk array 2. In this embodiment, a time code encoded is superimposed on the composite signal as described above. In the case where this time code is extracted from the composite video signal, a time code can be extracted easily by decoding only a digital-converted time code in the vertical synchronizing period when converting an analog signal to digital data.

The video data digital-converted is temporarily stored in the frame memory 11c. The read/write timing of this frame memory 11c is controlled by the processor controller 11a. The frame memory 11c is composed of two frame memories each which has the capacity of 1 Mbyte; totally it has the capacity of 4 Mbyte. The video data stored in the frame memory 11c is video data of 1,520 pixel by 960 pixel and video data for two frames can be stored in the above frame memory. The video data of 1,520 pixel by 960 pixel is read out in accordance with the read-out control of the processor controller 11a. The video data read out from the frame memory 11c is not video data of 1,520 pixel by 960 pixel, i.e., the all of pixels, but video data which has been thinned the data quantity so as to become 380 pixel by 240 pixel. Here, thinning the data quantity simply means that reducing the video data quantity read out by reducing the sampling rate of the video data read out from the frame memory 11c to ¼. The read out video data of 380 pixel by 240 pixel is outputted to the display controller 13 through the image data bus 5a.

The second video processor 12 has the completely same structure as that of the first video processor. That is, the processor 12 comprises a processor controller 12a for controlling the whole of the video processor 12, a data converting unit 12b for converting received analog composite video signal to digital component video data, and a frame memory 12c for temporarily storing video data for several frames which is outputted from the data converting unit 12b. The different point between the first video processor 11 and the second video processor is that in the first video processor 11, the composite video signal V2 is inputted, but in the second video processor 12, a composite video signal V3 is inputted.

The composite video signal V2 is a video signal in which a time code is superimposed in the vertical synchronizing period of the input video signal V1 in the hard disk array 2, therefore, it is the same video signal as an input video signal inputted at a real time in temporal. That is, the video data stored in the frame memory 11c is the same video data as a video signal that the input video signal is digitalized.

The composite video signal V3 is a video signal reproduced from the hard disk array by the instruction from the computer 1. Accordingly, the composite video signal V3 is a video signal not regarding to the input video signal V1 in temporal. That will be described in detail hereinafter. If the operator assigned to reproduce desired video data to the computer 1, the computer 1 outputs a playback command to the hard disk array 2. The hard disk array 2 reproduces video data assigned by the operator and a time code corresponding to that in response to the command from the computer 1. Note that, a time code and video data are stored so as to correspond to each other for each frame unit. The detailed structure in the hard disk array will be described later. Then, a reproduced time code is superimposed in the vertical synchronizing period of the reproduced video data. Thereafter, the video data is converted to the analog composite video signal V3 so as to be transmitted to the computer 1, and outputted thereto.

The composite video signal V3 supplied to the second processor is transmitted to the display controller 13 as digital video data of 380 pixel by 240 pixel, via the data converting unit 12b and the frame memory 12c in similar with the composite video signal supplied to the first video processor.

The display controller 13 is a control block for controlling data displayed on the monitor 14. The display controller 13 has a memory controller 13a and a VRAM (video random access memory) 13b. The memory controller 13a controls the read/write timing of the VRAM 13b in accordance with the internal synchronization in the computer 1. In the VRAM 13b, video data from the frame memory 11c of the first video processor 11, video data from the frame memory 12c of the second video processor 12, and image data from the CPU 10 are stored in accordance with a timing control signal from the memory controller 13a. The image data stored in the VRAM 13b is read out from the VRAM 13b in accordance with the timing control signal from the memory controller 13b which is based on the internal synchronization of the computer and then is graphically displayed on the video monitor 14. The graphic display displayed on the monitor 14 in the above manner becomes a graphic display for GUI. Here the image data outputted from the CPU 10 to the VRAM 13b is image data such as a window, a cursor and a scroll bar. The graphic display for GUI can be obtained by displaying these plural types of image data on the monitor.

The hard disk interface 15 is a block for interfacing to the local hard disk drive (HDD) 15a provided in the computer 1. The communication between the hard disk interface 15 and the hard disk drive 15a is performed according to the transmission format of the SCSI (small computer system interface). An application program for starting up by the computer 1 is installed in the hard disk drive 15a, so that when executing the application program, it is read out from the hard disk drive 15a and up-loaded to the RAM 11b. Further, when terminating this application program, a work file made by the editing operation stored in the RAM 11b is down-loaded to the hard disk 15a.

The floppy disk interface 16 is a block for interfacing to the floppy disk drive (FDD) 16a provided in the computer 1. The communication between the floppy disk interface 16 and the floppy disk drive 16a is performed according to the SCSI transmission format. In the floppy disk drive 16a, the EDL (edit decision list) showing the edition result of the editing operation is stored.

The pointing device interface 17 is a block for interfacing to the mouse 17a, the control panel 17b and the keyboard 17c which are connected to the computer 1. The pointing device interface 17 receives, for example, detection information of a two-dimensional rotary encoder which is provided in the mouse 17a, and click information of the left and right buttons provided on the mouse 17a, from the mouse 17a. The pointing device interface 17 decodes the received information and outputs it to the CPU 10. Similarly, the pointing device interface 17 receives information from the control panel 17b and the keyboard 17c to decode the received information and output it to the CPU 10.

The external interface 18 is a block for communicating with the hard disk array 2 which is externally connected to the computer 1. The external interface 18 has an RS-422 driver for converting command data generated in the CPU 10 to an RS-422 communication protocol.

Description of Graphic Display for GUI

Hereinafter, a graphic display for GUI will be described accompanying with FIG. 3. The graphic display on the monitor 14 is roughly classified into ten areas: a record video display area 21; a timing display area 22; a playback video display area 23; a record video marking area 24; a playback speed setting area 25; a recycle box area 26; a playback video marking area 27; a clip display area 28; an event display area 29; and a program display area 30. These areas will be described respectively in the above order.

The record video display area 21 has a record video screen 21a, a recording start point display portion 21b, a remaining time of memory display portion 21c, and an on recording display portion 21d.

A video signal displayed on the record video screen 21a is a video signal that is obtained from the composite video signal V2 outputted from the hard disk array 2, the video signal supplied from the frame memory 11c to the VRAM 13b so as to be 380 pixels×240 pixels.

In the recording start point display portion 21b, a time code showing the time point where recording of the video signal displayed on the record video screen 21a is started is displayed by the hard disk array 2.

In the remaining time of memory display portion 21c, remaining time of the memory of the hard disk array 2 is displayed. The operation of this remaining time can be easily obtained by subtracting the time subtracted the recording started time from the present time, from the recordable time of the hard disk array 2 because the whole capacity of the hard disk array 2 has been set previously.

The timing display area 22 has a one-minute clock display portion 22a, a time display portion 22b, an input video signal time code display portion 22c, a playback video signal time code display portion 22d, an on air display portion 22e, a mode button 22f, a preroll button 22g, and a playback speed setting (DMC: Dynamic Motion Control) button 22h.

The one-minute clock display portion 22a is an area for counting one minute (or three minutes) in a unit of second and visually displaying it. As the count is passed, the color of the display portion is changed second by second, therefore, the operator can grasp time passing visually. Saying that this one-minute display part 22a is used in which situation to count one minute, it is used when, for example, assigning an OUT point after counted one minute from the time when an IN point was assigned, and counting one minute from the start of preview when previewing the produced program.

In the time display portion 22b, the present time is displayed. In the record video signal time code display portion 22c, a time code corresponding to the video signal which is displayed in the record video display area 21. This time code is a time code extracted from the vertical synchronizing period of the composite video signal V2 by the processor controller 11a in the first video processor 11.

At the playback video signal time code display portion 22c, a time code corresponding to the video signal which is displayed in the playback video display area 23 is displayed. This time code is a time code extracted from the vertical synchronizing period of the composite video signal V3 by the processor controller 12a in the second video processor 12.

If a tarry signal which shows being on the air is supplied from an external device, the display color of the on air display portion 22e is changed to red. This signal showing being on the air is a signal supplied when the composite video signal V3 outputted from the hard disk array 2 is on the air. As the above, the color of the on air display portion 22e is variable, and so the operator can grasp being on the air visually.

Figure 3:
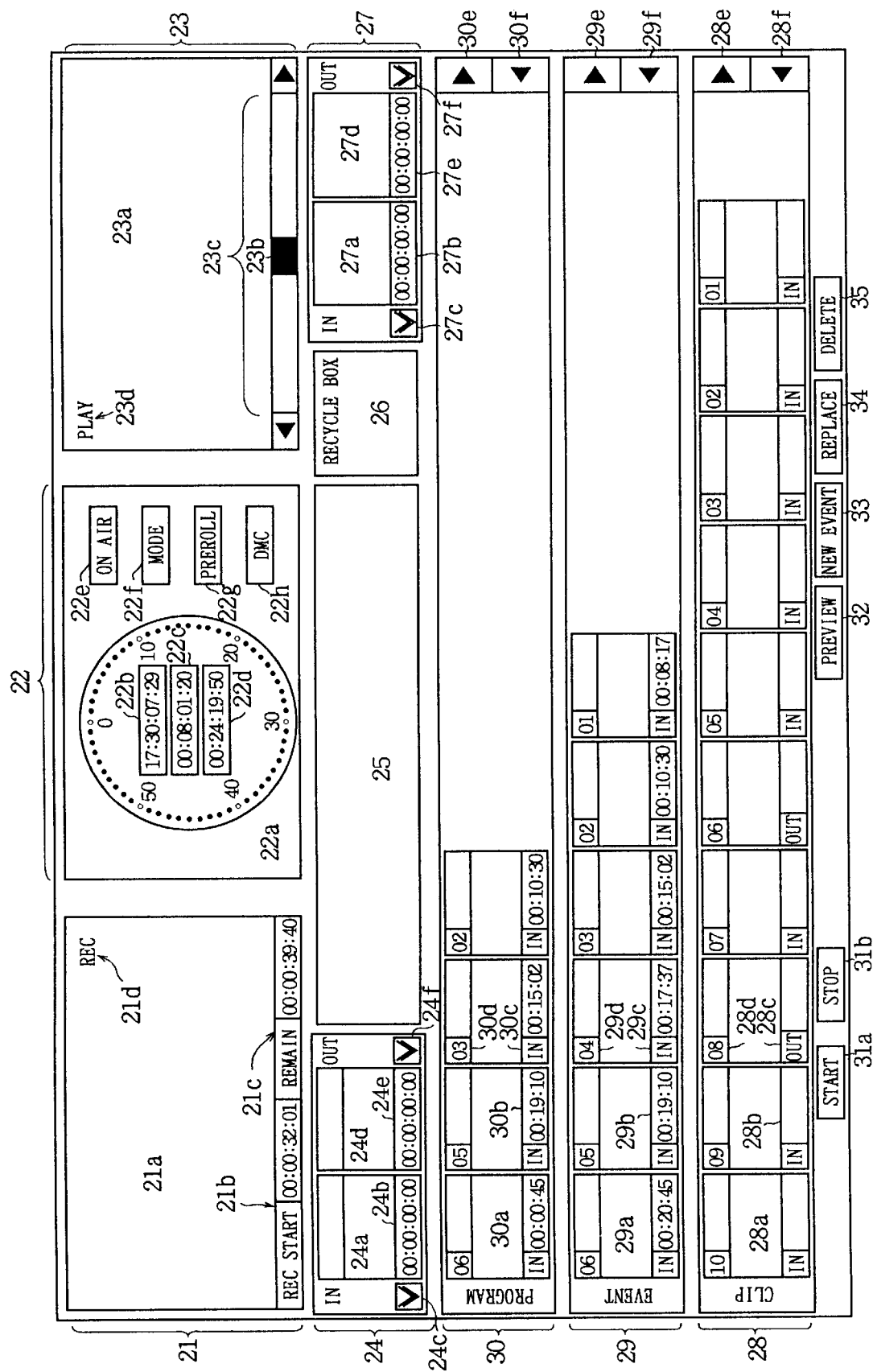
FIG. 3 is a diagram showing a graphic display for GUI displayed on the monitor 14 of the computer 1.

The mode button 22f is a button used when shifting between a picture mode for displaying a graphic image such as shown in FIG. 3 and a time line mode for displaying a time line. If the mode button 22f is clicked with the mouse 17a, the mode is shifted between the picture mode and the time line mode.

Note that, how to use of the preroll button 22g and the playback speed setting (DMC: dynamic motion control) button 22h will be described later.

In the playback video display area 23, a playback video screen 23a, a shuttle button 23b, jog buttons 23c and a playback state display portion 23d are provided.

A video signal displayed on the playback video screen 23a is a video signal which is obtained from the composite video signal V3 played back from the hard disk array 2, and supplied from the frame memory 12c to the VRAM 13b so as to be 380 pixels×240 pixels.

The shuttle button 23b is used when would like to review (i.e., shuttle sending) the video data which has been played back from the hard disk array 2 and displayed on the playback video screen 23a. If the shuttle button 23b is dragged toward the direction would like to send the video data by assigning with the mouse 17b, playback control of the hard disk array 2 is performed in accordance with the drag.

The jog buttons 23c are used when the user would like to send the video data played back from the hard disk array 2 and displayed on the playback video screen 23a frame by frame. If the user would like to send the video data displayed on the playback video screen 23a frame by frame, the user should click the jog button 23c of the direction would like to send frame by frame, thereby the playback video data is sent frame by frame.

At the playback state display portion 23d, the characters of "PLAY" or "STILL" are displayed: if the video data displayed on the playback video screen 23a is a motion image played back from the hard disk array 2, the characters "PLAY" are displayed, and if the video data displayed on the playback video screen 23a is a static image played back from the hard disk array 2, the characters "STILL" are displayed.

The record video marking area 24 is an area used when the clipped image data of an IN point or an OUT point is marked from the video data displayed on the record video screen. Herein "marking" means that assigns or sets an IN point or an OUT point. Furthermore, here "clip image" means a "static image". The record video marking area 24 has an IN clip display area 24a, a time code display portion 24b, a mark IN button 24c, an OUT clip display area 24d, a time code display portion 24e, and a mark OUT button 24f.

The IN clip display area 24a is an area where the clip image data of the IN point that has been marked by the operator as an IN point by clicking the mark IN button 24c. This clip image data displayed in the IN clip display area 24a is image data obtained from the composite video signal V2 outputted from the hard disk array 2 and supplied to the VRAM 13b so as to be 95 pixels×60 pixels.

At the time code display portion 24b, a time code of the clip image data displayed on the IN clip display area 24a is displayed. This time code is a time code extracted from the composite video signal by the processor controller 12a of the first video processor 11 when an IN point is marked by clicking the mark IN button 24c by the operator.

The mark IN button 24c is a button to mark an IN point. The operator clicks this button while viewing the video data displayed on the record video screen 21a. If the button 24c is clicked, clip image data (95 pixels×60 pixels) is generated from the video data displayed on the record video screen 21a at this time, and thus generated clip image data is displayed in the IN clip display area 24a. The description of the concrete operation will be done later.

The OUT clip display area 24d is an area to display the clip image data of the OUT point that has been marked by the operator by clicking the mark OUT button 24f. This clip image data displayed in the OUT clip display area 24b is image data obtained from the composite video signal V2 outputted from the hard disk array 2 and supplied to the VRAM 13b so as to be 95 pixels×60 pixels.

At the time code display portion 24e, a time code of the clip image data displayed in the OUT clip display area 24a. This time code is a time code extracted from the composite video signal by the processor controller 12a of the first video processor 11 when the operator marked an OUT point by clicking the mark OUT button 24c.

The mark OUT button 24c is a button to mark an OUT point. The operator clicks the mark OUT button 24c while viewing the video data displayed on the record video screen 21a. If the button 24c is clicked, clipped image data (95 by 60 pixels) is generated from the video data displayed on the record video screen 21a at this time, and thus generated clip image data is displayed in the OUT clip display area 24d. The description of the concrete operation will be done later.

The recycle box 26 is an area used when deleting the generated clip image data. On deletion, the user assigns the clipped image data with the mouse and drags the clipped image data to the area of the recycle box 26; thereby, deletion is performed. When restoring the deleted clip image data, if clicking the recycle box 26, the all of clip image data abandoned to the recycle box 26 is displayed. And if pointing clip image data desired to restore from those, the assigned clip image data is restored.

The playback video marking area 27 is an area used when marking clip image data of an IN point or OUT point from the video data displayed on the playback video screen 23a. This playback video marking area 27 has an IN clip display area 27a, a time code display portion 27b, a mark IN button 27c, an OUT clip display area 27d, a time code display portion 27e, and a mark OUT button 24f.

The IN clip display area 27a is an area to display the clip image data that has been marked by the operator as an IN point by clicking the mark IN button 27c. The clip image data displayed in the IN clip display area 27a is obtained from the composite video signal V3 outputted from the hard disk array 2 and supplied from the frame memory 12c to the VRAM 13b so as to be 95 by 60 pixels.

In the time code display portion 27b, a time code of the clip image data displayed in the IN clip display area 27a is displayed. This time code is a time code that was extracted from the composite video signal V3 by the processor controller 12a of the second video processor 12 when an IN point was marked by clicking the mark IN button 27c by the operator.

The mark IN button 27c is a button to mark an IN point. The operator clicks this mark IN button 27c while viewing the video data displayed on the playback video screen 23a. If the button 27c is clicked, clip image data (95 by 60 pixels) is generated from the video data displayed on the playback video screen 23a at this time, and thus generated clip image data is displayed in the IN clip display area 27a. The description of the concrete operation will be done later.

The OUT clip display area 27d is an area to display the clip image data of an OUT point that has been marked by the operator by clicking the mark OUT button 27f. The clip image data displayed in the OUT clip display area 27d is image data that is obtained from the composite video signal V3 outputted from the hard disk array 2 and supplied from the frame memory 12c to the VRAM 13b so as to be 95 pixels×60 pixels.

In the time code display portion 27e, a time code of the clip image data displayed in the OUT clip display area 27a. The time code is a time code that has been extracted from the composite video signal by the processor controller 12a of the second video processor 12 when the operator marked an OUT point by clicking the mark OUT button 24c.

The mark OUT button 27f is a button to mark an OUT point. The operator should click this mark OUT button 27f while viewing the video data displayed on the playback video screen 23a. If the button 27f is clicked, clip image data (95 pixels×60 pixels) is generated from the video data displayed on the playback video screen 23a at this time, and thus generated clip image data is displayed in the OUT clip display area 27d. The description of the concrete operation will be done later.

The clip display area 28 is an area to display the clip image data that has been marked by clicking the mark IN button 24c and the mark OUT button 24f, these are provided in the record video marking area 24, and the clip image data that has been marked by clicking the mark IN button 27c and the mark OUT button 27f, these are provided in the playback video marking area 27. Note that, the clip image data displayed in the clip display area 28 are clip image data which are not used as the IN point and the OUT point of an event. The clipped image data used as an IN point and an OUT point of an event are displayed in the event display area 29. The clip display area 28 has a clip image data display area 28a, a time code display portion 28b, a clip type display portion 28c, a clip number display portion 28d, a forward button 28e, and a backward button 28f.

The clip image data display area 28a is an area to display 95 pixels×60 pixels clip image data which has been moved from one of the IN clip display area 24a, the OUT clip display area 24d, the IN clip display area 27a and the OUT clip display area 27d.

In the time code display portion 28b, a time code of the clip image data displayed in the clip image displayed area 28a is displayed. This time code is moved similarly with the clip image data that has been moved from one of the IN clip display area 24a, the OUT clip display area 24d, the IN clip display area 27a and the OUT clip display area 27d to the clip image display area 28a.

In the clip type display portion 26c, data showing the clip image data displayed in the clip image data display area 28a is the clip image data of an IN point or an OUT point. If the clip image data displayed in the clip image data display area 28a is the clip image data obtained from the IN clip display area 24a, red characters "IN" are displayed. If the clip image data displayed in the clip image data display area 28a is the clip image data obtained from the OUT clip display area 24d, red characters "OUT" are displayed. If the clip image data displayed in the clip image data display area 28a is the clip image data obtained from the IN clip display area 27a, blue characters "IN" are displayed. And if the clip image data displayed in the clip image data display area 28a is the clip image data obtained from the OUT clip display area 27d, blue characters "OUT" are displayed.

In the clip number display portion 28d, a clip number which is added to the clip image data displayed on the clip image data display area 28a is displayed. This clip number is a number that is automatically added to clip image data in the order of that clip image data is marked.

The forward button 28e and the backward button 28f are used to move forward or backward the display of clip image data in the clip display area 28. In the case where many clip image data are generated, the all of clip image data cannot be displayed in the clip display area on the monitor. In such a case, this forward button 28e and the backward button 28f are operated to go forward or backward the clip image data, thereby, the all of clip image data can be displayed on the monitor.

The event display area 29 is an area to display the clip image data of the event, generated by clicking the mark IN button 24c and the mark OUT button 24f provided in the record video marking area 24 in this order, and the clip image data of the event, marked by clicking the mark IN button 27c and the mark OUT button 27f provided in the playback video marking area 27 in this order. Any one of the clip image data of an IN point or the clip image data of an OUT point is displayed per event. The event display area 29, similar with the clip display area 28, has a clip image data display area 29a, a time code display portion 29b, a clip type display portion 29c, an event number display portion 29d, a forward button 29e, and a backward button 29f, further, the area 29 has an event title display portion 29g.

In the clip type display portion 29c, data showing that the clip image data displayed in the clip image data display area 29a is which of the clip image data of an IN point or that of an OUT point. If the clip image data of the IN point is displayed as clip image data of the event, characters "IN" are displayed in the clip type display portion. If the operator would like to display the clip image data of the OUT point instead of the clip image data of the IN point, the operator should click this clip type display portion 29c so that the clip image data of the OUT point is displayed. Then the clip image data of the IN point and the clipped image data of the OUT point is displayed alternatively each time when the clip type display portion 29c is clicked.

In the event number display portion 29d, an event number which is added to the generated event is displayed. This event number is a number that is automatically added to the event and is not regard to the clip number.

In the event title display portion 29g, a title added to the event is displayed by characters.

In the program display area 30, a copy of the clip image data of the event displayed in the event display area 29 is displayed. By copying the clip image data of the event displayed in the event display area 29 to the program display area 30 by dragging, events displayed in the event display area 29 can be rearranged freely. Further, in the case where rearrangement of clipped image data is performed in the program display area 30, the operator should drag the clip image data of an event displayed in the program display area 30 to move it to the other place in the program display area 30 again, thereby, events can be rearranged freely. In this case, the event is not copied but moved. The program display area 30 has, similarly with the event display area 29, a clip image data display area 30a, a time code display portion 30b, a clip type display portion 30c, an event number display portion 30d, a forward button 30e, a backward button 30f, and an event title display portion 30g.

A recording start button 31a and a recording stop button 31b are buttons to output control commands of recording start and stop to the hard disk array 2. If the recording start button 31a is clicked, the CPU 10 grasps that the recording start button 31a was pushed and instructs the external interface 18 to output a recording start command. The external interface 18 converts the instruction from the CPU 10 into a recording stop command (REC stop command) which is defined in the RS-422 and outputs it to the hard disk array 2. The hard disk array 2 starts recording the input video signal V1 on a hard disk in response to the received recording stop command. If the recording stop button 31b is clicked, the CPU 10 detects that the recording stop button 31b was pushed, and instructs the external interface 18 to output a recording stop command. The external interface 18 converts the instruction from the CPU 10 into a recording start command (REC STOP command) which is defined in the RS-422 and outputs it to the hard disk array 2. The hard disk array 2 stops recording the input video signal V1 on the hard disk in response to the received recording start command.

A preview button 32 is used when previewing selected event and program or the like. If assigning an event, a program or the like, the clip image data of the assigned event, the program or the like is displayed in the state of a still image (STILL) on the playback video screen 23a. At this time, if this preview button 32 is clicked, the CPU 10 detects that the preview button was pushed, and instructs the external interface 18 to output a playback start command. The external interface 18 converts the instruction from the CPU 10 into a playback start command (PLAY START command) which is defined in the RS-422 and outputs it to the hard disk array 2. The hard disk array 2 starts playing back the composite video signal V3 from the hard disk in response to the received playback start command.

A new event button 33 is used when newly producing an event. In the case where an event in which the IN point and the OUT point are changed from the event assigned by the operator is registered as a new event, the operator should click this new event button 33.

A replace button 34 is used when the user would like to change an IN point and an OUT point of the selected event. In the case where the user replaces the event in which the IN point and the OUT point are changed from the event assigned by the user not as a new event but as this assigned event, the operator should click this replace button 33.

A delete button 35 is used when deleting a selected event or program. Thus deleted event or program is thrown away into the recycle box 26.

Description of Management Method of Clip Image Data

Hereinafter, it will be described about a storing method of clip data, event data and program data. Herein the clip data includes the data to display clip image data in the clip display area and the data to store clip image data. It is similar of the event data and the program data.

First, first management record data for clip data, event data and program data will be described with reference to FIG. 4.

One first management record data is provided for clip data, event data and program data respectively. That is, the first management record data for clip data is data to manage the all of clip image data displayed in the clip display area 28. Further, the first management record data for event data is data to manage the all of clip image data displayed in the event display area 29. Furthermore, the first management record data for program data is data to manage the all of clip image data displayed in the program display area 30. In this embodiment, only one first management record data exists for clip data, event data and program data respectively.

The first management record data has data regarding a pointer to the preceding linked data, a pointer to the following linked data, the horizontal display size for one page, the vertical display size for one page, a display position on the screen, a head display position, and the total number of links.

"Pointer to preceding linked data" is data showing the pointer of the management record data which is linked before the first management record data. If no management data linked before exists, the pointer of the first management record data own will be recorded.

"Pointer to following linked data" is data showing the pointer of the management record data which is linked after the first management record data. If no management record data linked after exists, the pointer of the first management record data own will be recorded.

"Horizontal display size for one page" is data showing the maximum display number of the clip image data which is displayed in the horizontal direction in each display area of the clip display area 28, the event display area 29 and the program display area 30. In this embodiment, eleven clip image data can be displayed in the each display area of the clip display area 28, the event display area 29 and the program display area 30 respectively, and so the data showing "eleven" is recorded in each management record data as the horizontal display size for one page.

"Vertical display size for one page" is data showing the maximum display number of the clip image data which is displayed in the vertical direction in the each display area of the clip display area 28, the event display area 29 and the program display area 30. In this embodiment, only one clip image data can be displayed in the clip display area 28, the event display area 29 and the program display area 30 respectively, and so the data showing "one" is recorded in each first management record data as the vertical display size for one page.

"Display position on screen" is data showing that the clip image data is displayed in which display area. In this embodiment, on the screen, the clip display area 28 is arranged in the lower column, the event display area 29 is arranged in the center column, and the program display area 30 is arranged in the upper column. Therefore, if it is the first management record data for clip data, the data showing "lower column" will be recorded as the data showing the display position on the screen, if it is the first management record data for event data, the data showing "center column"

will be recorded as the data showing the display position on the screen, and if it is the first management record data for program data, the data showing "upper column" will be recorded as the data showing the display position on the screen.

"Head display position" is data showing that the display of the clip image data is started from which position in the each display area of the clip display area 28, the event display area 29 and the program display area 30. In this embodiment, eleven clip image data can be displayed in the clip display area 28, eleven clip image data can be displayed in the event display area 29, and eleven clip image data can be displayed in the program display area 30; and so totally 33 clip image data can be displayed. These 33 display positions are managed by added a number in the upper order on the screen. For example, it is determined as follows: the display position of the program display area 30 is the display position of nos. 1 to 11; the display position of the event display area 29 is the display position of nos. 12 to 22; and the display position of the clip display area 28 is the display position of nos. 23 to 33. Accordingly, if it is the first management record data for clip data, the data showing "23" will be recorded as the data showing the head display position, if it is the first management record data for event data, the data showing "12" will be recorded as the data showing the head display position, and if it is the first management record data for program data, the data showing "1" will be recorded as the data showing the head display position.

"Total number of links" is data showing that how many management record data is linked after the first management record data.

Next, second management record data for clip data will be described hereinafter with reference to FIG. 5. The second management record data for clip data is data to manage the clip image data displayed in the clip display area 28 for each clip image data. Therefore, the same number of second management record data for clip data as the clip image data displayed in the clip display area 28 exists as that.

The second management record data for clip data has a pointer to the preceding linked data, a pointer to the following linked data, an attribute, a clip image data handle, a clip type, time code data, and an index number of the clip image data.

"Pointer to preceding linked data" is data showing the pointer of the management record data which is linked before the second management record data. Since first management record data or second management record data always exists before the second management record data, the pointer of the preceding linked data will be always recorded.

"Pointer to following linked data" is data showing the pointer of the management record data which is linked after the second management record data. If no management record data linked after exists, the pointer of the second management record data own will be recorded.

"Attribute" is data showing that the second management record data is for clip data, event data or program data.

"Clip image data handle" is data showing an address where the clip image data is recorded. Accordingly, the address where the clip image data is stored can be obtained by referring to the clip image data handle in the second management record data corresponding to the desired clip image data.

"Clip type" is data showing that the clip image data managed by the second management record data is the clip image data of IN point or the clip image data of OUT point.

"Time code data" is data showing a time code of the clip image data which is managed by the second management record data.

"Index number of clip image data" is an index number which is added to the clip image data. The index number is a number added to all of the marked clip image data in order, without regard to generation of an IN point, an OUT point and an event. That is, it is the same number as the clip number that is displayed in the clip number table portion 28*d*. All of the clip image data is managed by the index number.

Hereinafter, second management record data for event data and program data will be described with reference to FIG. 6. The second management record data for event data is data to manage the clip image data displayed in the event display area 29 for each clip image data. Therefore, the same number of second management record data for event data exists as the number of the clip image data displayed in the event display area 29. Similarly, the second management record data for program data is data to manage the clip image data displayed in the program display area 30 for each clip image data. Therefore, the same number of second management record data for program data exists as the number of the clip image data displayed in the program display area 30.

These second management record data for event data and program data have the pointer to the preceding linked data, the pointer to the following linked data, an attribute, an event number, a title, a subtitle, a clip image data handle of the IN point, a clip type of the IN point, time code data of the IN point, an index number of the clip image data of IN point, a clip image data handle of the OUT point, a clip type of the OUT point, time code data of the OUT point, an index number of the clip image data of OUT point, a slow type, a symbol type, and time code data of the symbol.

An explanation of the pointer to the preceding linked data, the pointer to the following linked data, and the attribute will be omitted because those are similar with the aforementioned second management record data for clip.

"event number" is a number which is added to an event in the sequence of generation. The event number is displayed in the event number display portion 29*d*.

"Title" and "subtitle" are a title and a subtitle which have been previously added to registered event, these are memorized in practical characters. The title is displayed in the title display portion 29*g*.

"Clip image data handle of IN point" is data showing an address where the clip image data of IN point is recorded. By referring to the clip image data handle of the IN point in the second management record data which corresponds to the desired clip image data of IN point, an address where the clip image data of IN point is stored can be obtained.

"Clip type of IN point" is data showing that the clip image data of IN point managed by the second management record data is the clip image data of IN point or the clip image data of OUT point. Herein all of the data showing the clip image data of IN point will be stored.

"Time code data of IN point" is data showing a time code of the clip image data of IN point managed by the second management record data.

"Index number of clip image data of IN point" is an index number which is added to the clip image data of IN point. Similarly with the aforementioned index number in the second management record data for clip data, the index number of the clip image data of IN point is a number which is added to all of the marked clip image data in order without regarding to generation of an IN point, an OUT point and an event.

"Clip image data handle of OUT point" is data showing an address where the clip image data of OUT point is recorded. Thus, by referring to the clip image data handle of OUT point in the second management record data which corresponds to the desired clip image data of OUT point, an address where the desired clip image data of OUT point is stored can be obtained.

"Clip type of OUT point" is data showing that the clip image data of OUT point managed by the second management record data is the clip image data of IN point or the clip image data of OUT point. Herein all of the data showing the clip image data of an OUT point is stored.

"Time code data of OUT point" is data showing a time code of the clip image data of OUT point managed by the second management record data.

"Index number of clip image data of OUT point" is an index number which is added to the clip image data of OUT point. Similarly with the aforementioned index number in the second management record data for clip data, the index number of the clip image data of OUT point is a number which is added to all of the marked clip image data in order without regarding to generation of an IN point, an OUT point and an event.

"Slow type" is data showing that the event or the program managed by the second management record data, to which playback speed control is set using the playback speed setting area 25 or normal playback control is set.

"Symbol type" is data showing that clip image data defined as a symbol exists or not in the period between IN point and OUT point of an event managed by the second management record data. "Symbol" means typical clip image data representing the event.

"Time code data of symbol" is a time code of the clip image data which has been set as a symbol.

Hereinafter, how to manage clip image data by using the aforementioned first management record data and second management record data will be described giving an example.

It will be described about a management method of the clip image data with reference to FIGS. 7, 8, 9A, 9B and 9C.

The column of "marking" shown in FIG. 7 shows that marking is performed of IN or OUT. In this example, it means that marking is performed 15 times, IN, IN, OUT, IN, OUT, IN, IN, IN, OUT, IN, OUT, IN, IN, IN, IN from the left. At the column of "INDEX No.", an index number which has been added to the marked clip image data of IN point or OUT point is shown. The index number is a number added to the all of marked clip image data in order without regarding to IN point and OUT point. Accordingly, the index number 1 to 15 is added to each marked clip image data in order, as shown in FIG. 7. At the column of "clip No.", a clip number displayed in the clip number display area 28d of the clip display area 28 is shown. Note that, the clip number displayed in the clip number display area 28d is the same number as the index number. At the column of "event No.", an event number displayed in the event number display area 29d of the event display area 29 is shown. The event number is a number which is automatically added in generation order of event without completely regarding to the index number and the clip number.

FIG. 8 is a diagram showing that which clip image data is displayed in the clip display area 28, the event display area 29 and the program display area 30, in the case where marking is performed as shown in FIG. 7.

In the clip display area 28, the clip image data of index No. 1, the clip image data of index No. 6, the clip image data of index No. 7, the clip image data of index No. 12, the clip image data of index No. 13, and the clip image data of index No. 14 are displayed in order.

In the event display area 29, produced four events are displayed. The clip image data of index No. 2 is displayed as the event of event No. 1, the clip image data of index No. 4 is displayed as the event of event No. 2, the clip image data of index No. B is displayed as the event of event No. 3, and the clip image data of index No. 10 is displayed as the event of event No. 4 in order, respectively.

In the program display area 30, any clip image data is not displayed only by assigning an IN point and an OUT point. In this example, it is assumed that the program shown in FIG. 8 is produced by rearranging the four events displayed in the event display area 29. The program is a program which is successive in the sequence of, the event of event No. 2, the event of event No. 4, and the event of event No. 1. Thus in the program display area 30, the clip image data of index No. 4 which has been registered as the event of event No. 2, the clip image data of index No. 10 which has been registered as the event of event No. 4, and the clip image data of index No. 2 which has been registered as an event of event No. 1 are displayed.

Figure 9A:
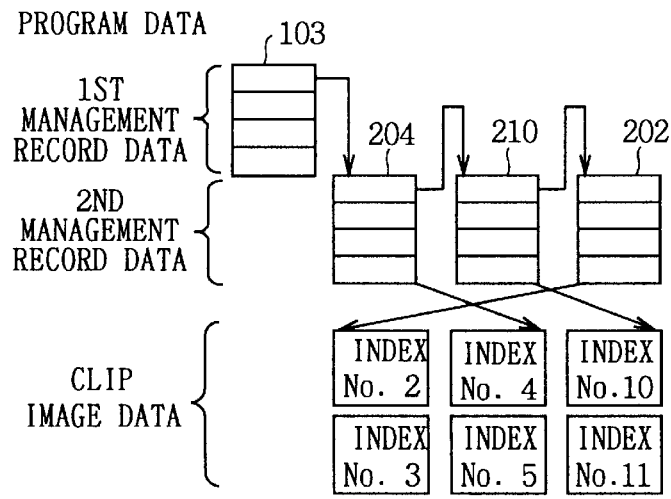
FIG. 9A is a diagram showing the link state of management record data for managing program data.
Figure 9B:
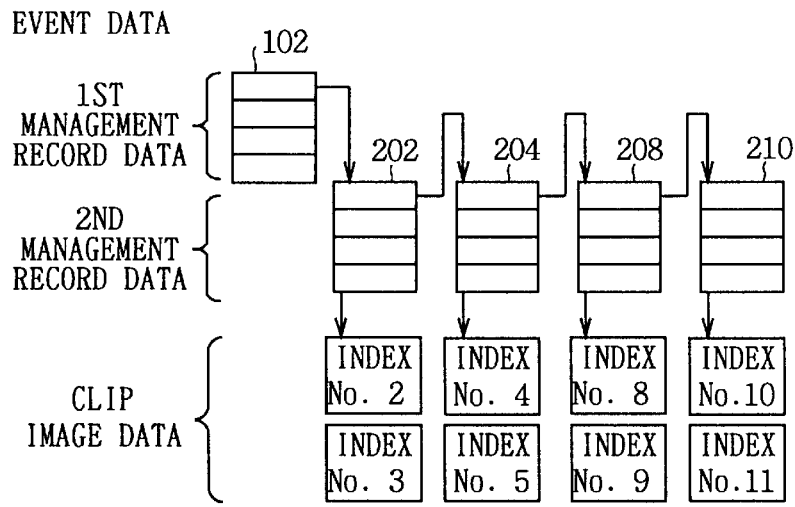
FIG. 9B is a diagram showing the link state of management record data for managing event data.
Figure 9C:
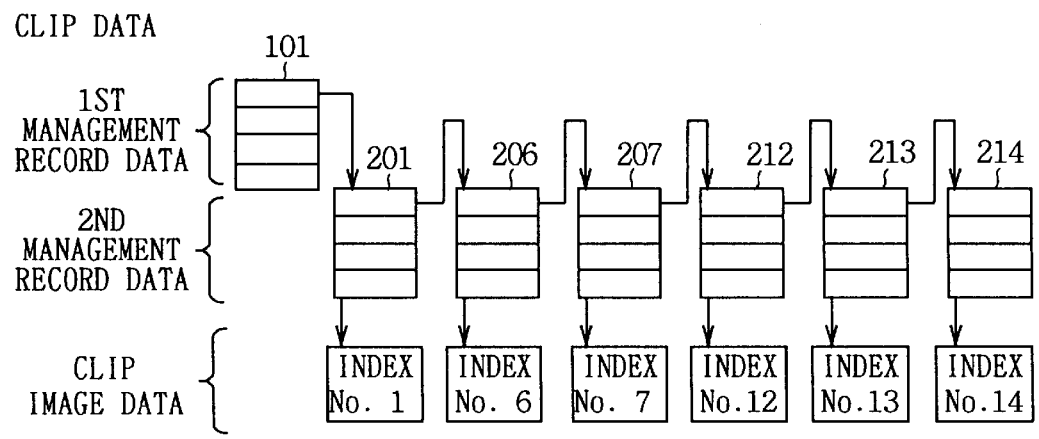
FIG. 9C is a diagram showing the link state of management record data for managing clip data.

FIG. 9A, FIG. 9B and FIG. 9C are diagrams showing how to manage clip image data by the first management record data and the second management record data.

FIG. 9C shows the state where the clip image data displayed in the clip display area 28 is managed. Management record data 101 is first management record data for clip. As shown in FIG. 4, this first management record data 101 has the data to manage the whole area of the clip display area 28 and the position of the clip image data displayed in the clip display area.

Management record data 201 which is linked after the first management record data 101 is second management record data for clip. This second management record data 201 is the data to manage the clip image data of index No. 1. As shown in FIG. 5, the second management record data 201 has the clip image data handle which shows an address where the clip image data of index No. 1 is stored.

Management record data 206 which is linked after the second management record data 201 is second management record data for clip. This second management record data 206 is the data to manage the clip image display data of index No. 6 and has the clip image data handle which shows an address where the clip image data of index No. 6 is stored.

Similarly, second management record data 207 to manage the clip image data of index No. 7 is linked after the second management record data 206, second management record data 212 to manage the clip image data of index No. 12 is linked after the second management record data 207, second management record data 213 to manage the clip image data of index No. 13 is linked after the second management record data 212, and second management record data 214 to manage the clip image data of index No. 14 is linked after the second management record data 213.

FIG. 9B shows the state where the clip image data displayed in the event display area 29 is managed. Management record data 102 is first management record data for event. As shown in FIG. 4, this first management record data 102 has the data to manage the whole area of the event display area 29 and the position of the clip image data displayed in the clip display area 29.

Management record data 202 which is linked after the first management record data 102 is second management record data for event. As shown in FIG. 6, this second management record data 202 has the data to manage the clip image data of IN point shown by index No. 2 and the clip image data of OUT point shown by index No. 3. Concretely, the second management record data 202 has a clip image data handle of IN point showing an address of the clip image data of IN point shown by index No. 2 and a clip image data handle of OUT point showing an address of the clip image data of OUT point shown by index No. 3.

Similarly, second management record data 204 to manage the clip image data of IN point of index No. 4 and the clip image data of OUT point of index No. 5 is linked after the second management record data 202, second management record data 208 to manage the clip image data of IN point of index No. 8 and the clip image data of OUT point of index No. 9 is linked after the second management record data 204, and second management record data 210 to manage the clip image data of IN point of index No. 10 and the clip image data of the OUT point of index no. 11 is linked after the second management record data 208.

FIG. 9A shows the state where the clip image data displayed in the program display area 30 is managed. Management record data 103 is first management record data for program. As shown in FIG. 4, this first management record data 103 has the data to manage the whole area of the program display area 30 and the position of the clip image data displayed in the program display area 29.

Second management record data 204 to manage the clip image data of IN point of index No. 4 and the clip image data of OUT point of index No. 5 is linked after the first management record data 103, second management record data 210 to manage the clip image data of IN point of index No. 10 and the clip image data of OUT point of index No. 11 is linked after the second management record data 204, and second management record data 202 to manage the clip image data of IN point of index No. 8 and the clip image data of OUT point of index No. 9 is linked after the second management record data 210.

Here it is tried to compare FIG. 9B illustrating the management of the event data with FIG. 9A illustrating the management of the program data. Between FIG. 9A and FIG. 9B, the storing order of the clip image data of index No. 2, the clip image data of index No. 4 and the clip image data of index No. 10 are not changed completely. This means that the storing position of the clip image data are not changed completely. The different point between FIG. 9A and FIG. 9B is the point that the link order of the second management record data is changed. That is, this invention changes the link order of the second management record data which manages the clip image data directly to change the display order of events without changing the storing position of the clip image data showing event. Therefore, it has an effect that change of the display order of events can be conducted with high speed.

Also, it is not limited to change of the display order of events but also is completely similar in changing the display order of the clip image data which is displayed in the clip table area 28. For example, even if the display order of the clip image data is changed by deleting or newly adding clip image data, it will not be needed to move the storing position of the clip image data practically, and it will be only needed to change the link information of the second management record data.

Hereinafter, first marking to fifteenth marking will be explained in order.

Before starting the marking, in the head address of an area to be stored the work data of the RAM 10b, the first management record data 101 for clip data, the first management record data 102 for event data and the first management record data 103 for program data are formed already. However, any management record data has no second management record data linked, that is, their own address has been stored as "pointer to following linked data".

a) First marking (IN point)

After performing the first marking, 95 pixels×60 pixels clip image data is formed by controlling read-out from the frame memory 11c. The formed clip image data is stored in an empty area of the RAM 10b as the clip image data of index No. 1. At the same time as the storing, the formed clip image data is displayed in the IN clip display area 24a. At this time, the second management record data 201 managing this clip image data has been temporary stored in the register in the CPU 10 and it has not been stored in the RAM 10b. Because it is not clear that this second management record data 201 will be linked to which management record data.

b) Second marking (IN point)

After performing the second marking, the clip image data of index No. 2 is formed and stored in an empty area of the RAM 10b similarly. At this time, from that IN point has marked twice successively, it is understood that the clip image data of index No. 1 which has been displayed in the IN clip display area 24a will not be used as event. Thus the clip image data of index No. 1 which has been displayed in the IN clip display area 24a is moved to the clip display area 28. Further, by the second marking, the second management record data managing the clip image data of index No. 1 is determined to be linked to the first management record data 101 for clip data. Therefore, as shown in FIG. 9C, the second management record data 201 which has been temporary stored in the register of the CPU 10 is stored in the RAM 10b so as to be linked to the first management record data 101.

On the other hand, the clip image data of index No. 2 which has been generated in the second marking is newly displayed in the IN clip display area 24a. Similarly with the first marking, the second management record data 202 managing the clip image data of index No. 2 is temporary and newly stored in the register in the CPU 10.

c) Third marking (OUT point)

After performing the third marking, the clip image data of index No. 3 is formed and stored in an empty area of the RAM 10b similarly. Since this third marking is OUT point, the event in which the clip image data of index No. 2 is IN point and the clip image data of index No. 3 is OUT point is formed. Accordingly, the clip image data of index No. 2 which has been displayed in the IN clip display area 24a is copied to the event display area 28 as it is displayed in the IN clip display area 24a. Furthermore, by the third marking, the second management record data 202 managing the clip image data of index No. 2 stored in the register is determined to be linked to the first management record data 102 for event data. Accordingly, as shown in FIG. 9B, the second management record data 202 which has been temporary stored in the register of the CPU 10 is stored in the RAM 10b so as to be linked to the first management record data 102.

On the other hand, the clip image data of index No. 3 generated in the third marking is newly displayed in the OUT clip display area 24d. Note that, since the second management record data 202 managing the clip image data of index No. 3 is determined to be linked to the first management record data 102, it is not temporary stored in the register of the CPU 10.

d) Fourth marking (IN point)

After performing the fourth marking, the clip image data of index No. 4 is formed and stored in an empty area of the RAM 10b similarly. At the same time as the storing, the formed clip image data is displayed in the IN clip display area 24a. Also, similarly with the first marking, the second management record data 204 managing the clip image data of index No. 4 is temporary stored in the register in the CPU 10. Note that, the clip image data of index No. 3 which has been displayed in the OUT clip display area 24d has been recorded already, thus it is cleared away from the display area 24d.

e) Fifth marking (OUT point)

After performing the fifth marking, the clip image data of index No. 5 is formed and stored in an empty area of the RAM 10b similarly. Similar with the third marking, since the fifth marking is OUT point, the event in which the clip image data of index No. 4 is IN point and the clip image data of index No. 5 is OUT point is formed. Accordingly, the clip image data of index No. 4 which has been displayed in the IN clip display area 24a is copied to the event display area 29 as it is displayed in the IN clip display area 24a. Furthermore, by the fifth marking, the second management record data 204 managing the clip image data of index No. 4 stored in the register is determined to be linked to the previously stored second management record data 202. Accordingly, as shown in FIG. 9B, the second management record data 204 which has been temporary stored in the register of the CPU 10 is stored in the RAM 10b so as to be linked to the second management record data 202.

On the other hand, the clip image data of index No. 5 generated in the fifth marking is newly displayed in the OUT clip display area 24d. Note that, since the second management record data 204 managing the clip image data of index No. 5 is determined to be linked to the second management record data 202, it is not temporary stored in the register in the CPU 10.

f) Sixth marking (IN point)

After performing the sixth marking, the clip image data of index No. 6 is formed and stored in an empty area of the RAM 10b similarly. At the same time as the storing, the formed clip image data of index No. 6 is displayed in the IN clip display area 24a. Also, similarly with the fourth marking, the second management record data 206 managing the clip image data of index No. 6 is temporary stored in the register in the CPU 10. Note that, the clip image data of index No. 5 which has been displayed in the OUT clip display area 24d has been recorded already, thus it is cleared away from the display area 24d.

g) Seventh marking (IN point)

After performing the seventh marking, the clip image data of index No. 7 is formed and stored in an empty area of the RAM 10b similarly. Since IN point is marked twice successively, the clip image data of index No. 6 which has been displayed in the IN clip display area 24a is moved to the clip display area 28. Further, by the seventh marking, the second management record data 206 stored in the register of the CPU 10 is stored in the RAM 10b so as to be linked to the second management record data 201, as shown in FIG. 9C. On the other hand, the formed clip image data of index No. 7 is displayed in the IN clip display area 24a. Also, similarly with the sixth marking, the second management record data 207 managing the clip image data of index No. 7 is temporary stored in the register in the CPU 10.

The ninth to the fifteenth marking are performed in similar manner with the first to the seventh marking, thus its explanation is omitted.

Description of the Hard Disk Array 2

Figure 10:
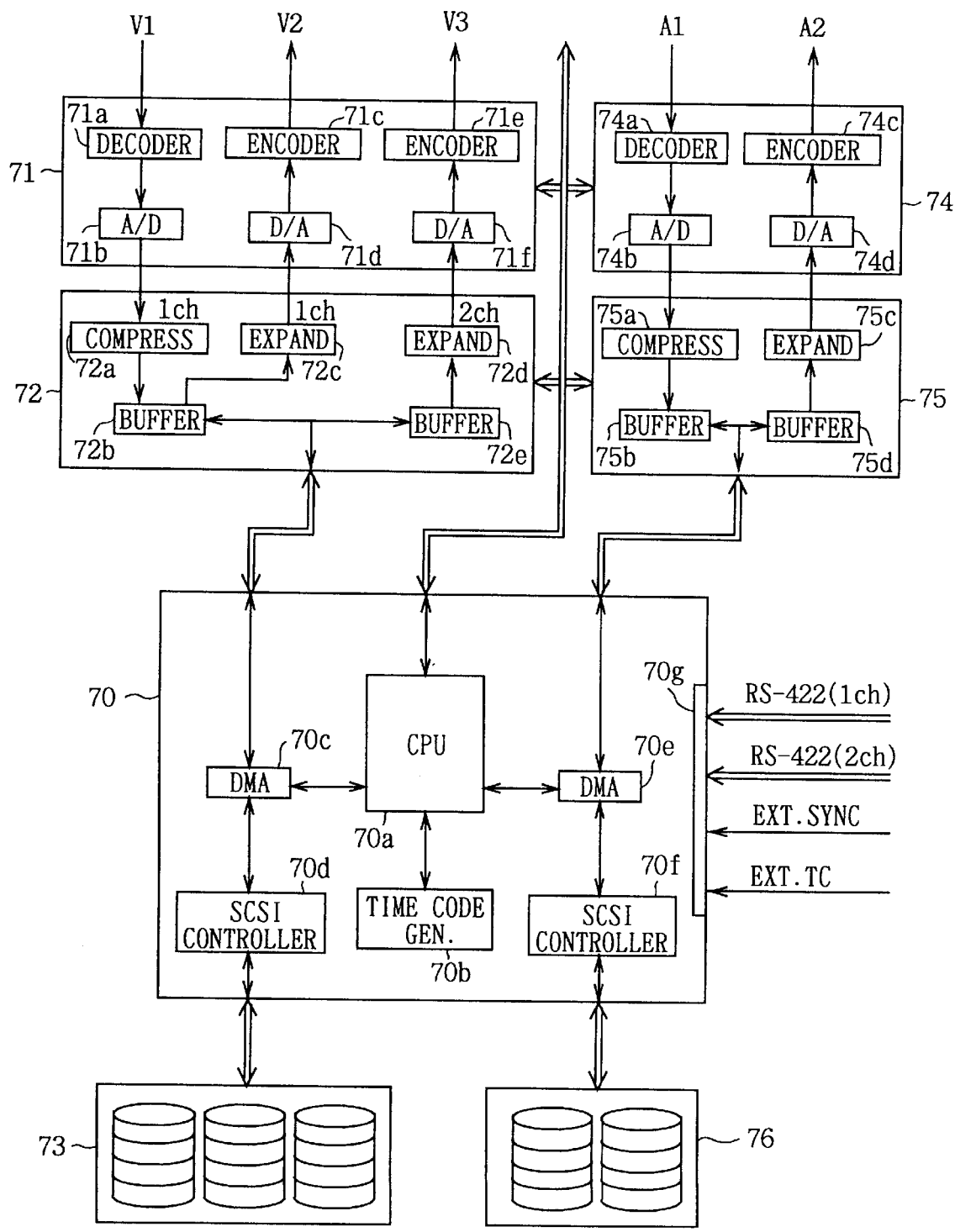
FIG. 10 is a diagram showing the internal structure of the hard disk array 2.

Hereinafter, it will be described about the hard disk array 2 with reference to FIG. 10. FIG. 10 shows the general construction of the hard disk array 2.

The hard disk array 2 has a system controller 70 as the center, a video data input/output unit 71, a video data processor unit 72, a video data hard disk 73, an audio data input/output unit 74, an audio data processor unit 75, and an audio data hard disk 76.

The system controller 70 has a CPU 70a, a time code generator 70b, a DMA controller (Direct Memory Access Controller) 70c, an SCSI controller 70d, a DMA controller 70e, and an SCSI controller 70f.

The CPU 70a is a central processing unit performing the control of the all of blocks of the hard disk array 2. The CPU 70a receives a control command according to the communication protocol of RS-422 which is supplied from external equipment to the system controller, and controls the DMA controllers 70c and 70f and the SCSI controllers 70d and 70f in accordance with the command. Also, the CPU 70a receives an external time code (Ext. TC) which is supplied a time code from the time code generator 70b or the external equipment to the system controller 70 and supplies the received time code data to the video data input/output unit 71 and the audio data input/output unit 74. Further, the CPU 70 has a RAM in which all record addresses of video data which are stored in the video hard disk 73 in each frame unit and all time codes of recorded frames are corresponded to each other and stored therein. Similarly, all record addresses of audio data which are stored in the audio hard disk 76 in each frame unit and all time codes of recorded frames are corresponded to each other and stored in the same RAM. Thereby, by only assigning a time code from external equipment, video data and audio data can be reproduced.

The DMA controller 70c controls read-timing at the time when video data is read-out from buffer memories 72b and 72e, provided in the video data processor unit 72, and also controls write-timing at the time when video data is written-in to the buffer memories 72b and 72e, in accordance with a command from the CPU 70a.

The SCSI controller 70d converts the control command from the CPU 70a, video data in frame unit which is received from the DMA controller 70c, and time code data which relates to the frame video data into the communication command of SCSI and outputs them to the video data hard disk 73. Further, the video data reproduced from the hard disk 73 is converted from the SCSI communication command and supplied to the DMA controller 70c.

The DMA controller 70e controls read-timing at the time when audio data is read-out from buffer memories 75b and 75d which are provided in the audio data processor unit 75, and also controls write-timing at the time when audio data is written-in the buffer memories 75b and 75d.

The SCSI controller 70f converts the control command from the CPU 70a, audio data in frame unit which is received from the DMA controller 70e, and time code data which relates to the frame audio data into SCSI communication commands, and outputs them to the audio data hard disk 76. Further, the audio data reproduced from the hard disk 76 is converted from the SCSI communication command and supplied to the DMA controller 70e.

The input system of the video data input/output unit 71 is composed of that: a decoder 71a in which the synchronizing signal of input video signal V1 is extracted and the input video signal V1 is converted to component signal; and an A/D converter circuit 71b in which the analog component video signal is converted to digital video signal. The output system of the video data input/output unit 71 is composed of that: a D/A converter circuit 71d in which reproducing video signal of a first channel, supplied from the video data processor unit 72 is converted to analog; an encoder 71c in which the first channel reproducing video signal is converted to composite signal and vertical synchronizing signal on which a time code is superimposed is added to the outputted composite video signal based on the phase of external synchronizing signal (Ext. Sync) supplied to the system controller 70; a D/A converter circuit 71f in which second channel reproducing video signal, supplied from the video data processor unit 72 is converted to analog; and an encoder 71e in which the second channel reproducing video signal is converted to composite signal and vertical synchronizing signal on which a time code is superimposed is added to the outputted composite video signal based on the phase of the external synchronizing signal (Ext. Sync) supplied to the system controller 70.

The input system of the video data processor unit 72 has that: a compressor unit 72a in which the video data supplied from the video data input/output unit 71 is compressed in each frame unit according to the JPEG standard; and a buffer memory 72b in which the video data from the compressor unit 72 is stored in accordance with a write command from the DMA controller 70c, and the compressed video data is supplied to an expander unit 72c or the DMA controller 70c in accordance with the write command from the DMA controller 70c. The output system of the video data processor unit 72 has that: the expander unit 72c in which the compressed video data from the buffer memory 72b is received, expanded and outputted as the first channel video data; and an expander unit 72d in which the compressed video data from the buffer memory 72e is received, expanded and outputted as the second channel video data. Also, the video processor unit 72 has the buffer memory 72b for storing the first channel video data, and the buffer memory 72e for storing the second channel video data. These buffer memories 72b and 72e are constituted of an FIFO memory and have the capacity capable of storing the video data for 15 frames.

The audio data input/output unit 74 has that: a decoder 74a in which input audio signal A1 is converted; an A/D converter circuit 74b in which the analog audio signal is converted to digital audio data; a D/A converter circuit 74d in which reproducing audio data supplied from the audio data processor unit 75 is converted to analog; and an encoder 74c in which the analog audio signal supplied from the D/A converter circuit 74d is converted to the audio signal A2.

The audio data processor unit 75 has that: a compressor unit 75a in which the audio data supplied from the audio data input/output unit 74 is compressed; the buffer memory 75b in which the audio data from the compressor unit 75a is stored based on the control command from the DMA controller 70e, and the compressed audio data is supplied to the DMA controller 70e; the buffer memory 75d in which the reproduced audio data is received from the DMA controller 70e and outputted to an expander unit 75c; and the expander unit 75c in which the reproduced audio data is received from the buffer memory 75d and the compressed audio data is expanded.

Hereinafter, recording and reproducing operation of the hard disk array will be described.

Video signal supplied to the video data input/output unit 71 is conducted prescribed input/output processing and supplied to the video data processor unit 72. The video data compressed in the compressor unit 72a of the video data processor unit 72 is supplied to the buffer memory 72b. The video data supplied to the buffer memory 72b, the same video data is outputted to the both of the DMA controller 70c and the expander circuit 72c in accordance with the read command from the DMA controller 70c. The CPU 70a outputs a record address to the SCSI controller 70d so that time code data supplied from the time code generator 70b and the video data supplied to the DMA controller 70c are related to each other. The SCSI controller 70d supplies a record command and the video data to the hard disk 73 so that the video data received from the DMA controller 70c is recorded in the address assigned from the CPU 70a.

On the other hand, the video data supplied to the expander circuit 72c is expanded as the first channel video data and outputted to the video data input/output unit 71. The video data input/output unit 71 superimposes the time code supplied from the CPU 70a on the vertical synchronizing period of the supplied video data and outputs it as the composite video signal V2.

It will be described about reproducing processing of the hard disk array 2, hereinafter.

If a reproducing command according to the RS-422 communication protocol is outputted to the hard disk array 2, the CPU 70a will output the reproducing command to the hard disk 73 via the SCSI controller 70d. The reproduced video data is stored to the buffer memory 72e in accordance with write-timing of the DMA controller 70c. The video data read out from the buffer memory 72e is expanded as the second channel video data by the expander circuit 72d and outputted to the video data input/output unit 71. The video data input/output unit 71 superimposes the time code supplied from the CPU 70a on the vertical synchronizing period of the supplied video data and outputs it as the composite video signal V3.

Here it will be described about the reason that the recording processing of the input video signal V1 and the playback processing of the video signal V3 can be performed simultaneously. While the DMA controller 70c is outputting a read command to the buffer memory 72b, recording of video signal is performed from the buffer memory 72b to the hard disk 73, and while the DMA controller 70c is outputting a write command to the buffer memory 72e, reproduction of the video signal recorded in the hard disk 73 is performed and the reproduced video data is supplied to the buffer memory 72e. More specifically, since the transmission of video data to be recorded to the hard disk 73 is buffered by the buffer memory 72b and the transmission of the video data reproduced from the hard disk 73 to the video data input/output unit 71 is buffered by the buffer memory 72e, seemingly the recording processing of the input video signal V1 and the reproducing processing of the video signal V3 seems to be performed simultaneously. Strictly speaking, the recording operation and the reproducing operation are not at the same time because the recording operation of the hard disk 73 and the reproducing operation is performed alternatively.

Description of Computer's Operation

The initial operation of the computer 1 will be described with reference to FIG. 11.

At first, if execution of an application program is assigned by an operator, the processing is started at step SP1.

Since this application program has been stored in the local hard disk 15a, the CPU 10 uploads the application program to the operating RAM 10b provided in the CPU 10 at step SP2.

After completing the uploading to the RAM 10b in the CPU 10, the CPU 10 executes the application program at step SP3.

At step SP4, the memory area of the RAM 10b is ensured. The memory area is ensured to store each data of plural clip image data and edition data that will be generated by editing operation in the RAM 10b. At this step SP4, the first management record data for clip data shown in FIG. 9C, the first management record data for event data shown in FIG. 9B and the first management record data for program data shown in FIG. 9A are recorded in the RAM 10b.

At step SP5, a work folder to store such as a program and event data which will be produced by the editing operation by the computer 1. The produced work holder is recorded in the local hard disk 15a.

At step SP6, the CPU 10 transfers graphic data to the VRAM 13b at a real time in order to display the graphic display for GUI on the monitor 14.

At step SP7, the same graphic as the graphic data stored in the VRAM 13b is displayed on the monitor 14.

At step SP8, whether the input video signal V2 should be displayed or not on the record video screen 21a is confirmed. If there is no assignment of video display, it is judged that the editing operation will not be performed, and it proceeds to step SP16 to terminate. If it is in the normal case, it proceeds to step SP9 because it is necessary that the input video signal V2 is displayed on the record video screen 21a to perform editing operation.

At step SP9, a control command of RS-422 is outputted to the hard disk array 2 so that the video signal V2 is outputted to the computer 1. The hard disk array 2, after receiving the control command from the computer 1, generates video signal V2 as the first channel video signal from the input video signal V1 and outputs it to the computer 1.

At step SP10, in the data converter unit 11b, a time code is extracted from the composite video signal V2 supplied to the computer 1 and also the inputted composite video signal is converted to digital component video data. The converted video data is temporary stored in the frame memory 11e in each frame unit. The processor controller 11a outputs the time code data extracted in the data converter unit 11b to the CPU 10.

At step SP11, the video data stored in the frame memory 11c is transferred to the VRAM 13b. The video data to be transferred has less read sampling from the frame memory 11c that is 380 pixels×240 pixels video data. Note that, at this time, mediation of the image data bus 5a is performed so that the data transferred to the VRAM 13b is not only the video data from the frame memory 11c but also the video data is transferred from the frame memory 11c in the area where video data is displayed and image data is transferred from the CPU 10 in the area where a graphic image for GUI is displayed. Further, the data stored in the VRAM 13b is updated at a real time so that video data can be displayed on the monitor 14 at a real time.

At step SP12, the graphic data and the video data which have been stored in the VRAM 13b are displayed on the monitor 14 at a real time.

At step SP13, it is judged whether the hard disk array 2 should start or not the recording of the video data displayed in the record video screen 21a. If it should start recording "START" button 31a is clicked.

At step SP14, if recording start is assigned, the CPU 10 outputs the command to the external interface 18. The external interface 18 converts it to the communication format of the RS-422 standard and outputs it to the hard disk array 2.

At step SP15, since recording has been started by the hard disk array 2, it is judged that all initial setting has completed, and this flow is terminated.

Description of First Marking Operation

Figure 12:
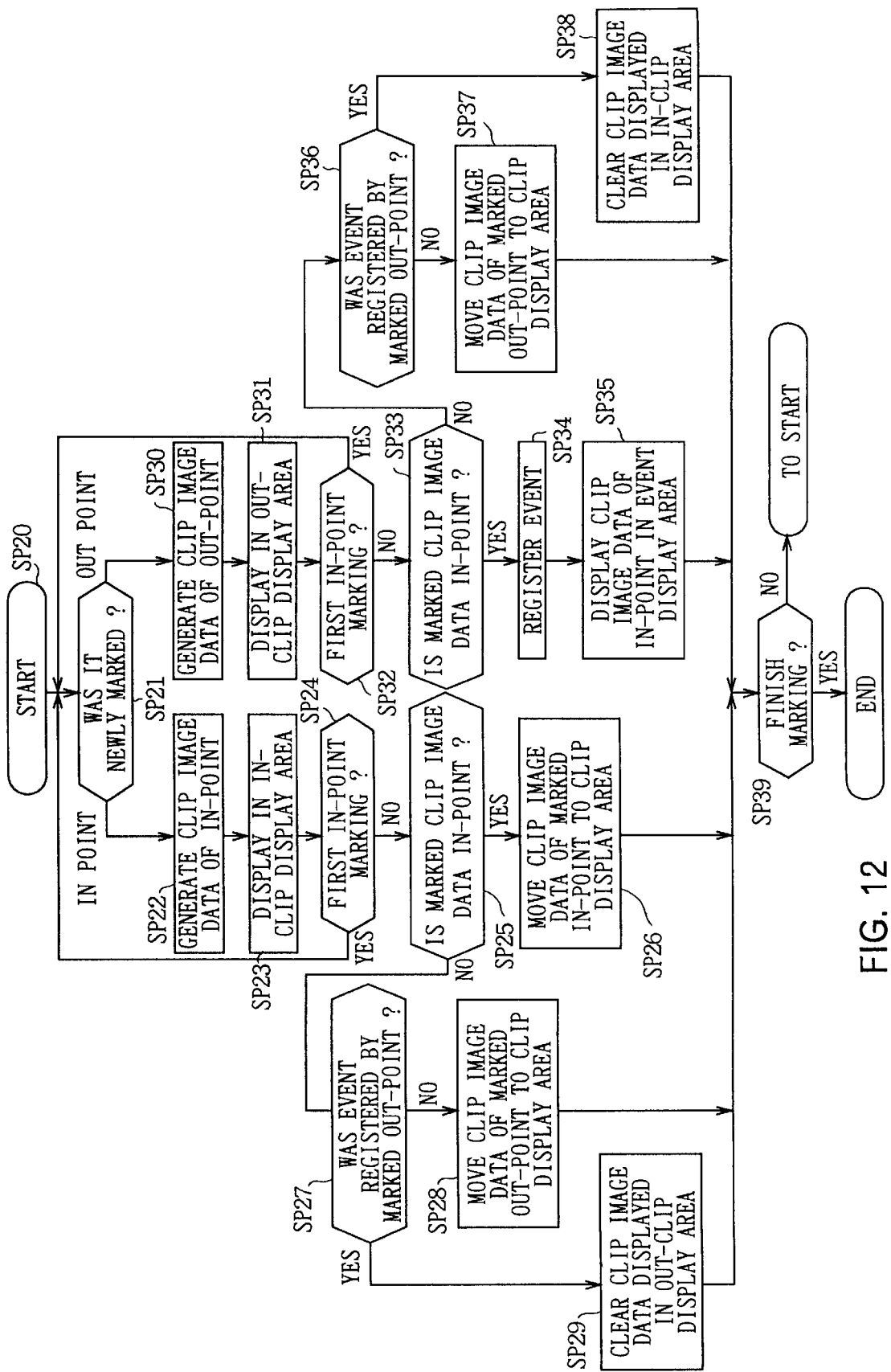
FIG. 12 is a flowchart showing the first marking operation of this edition system.

Hereinafter, it will be described about marking operation in detail with reference to FIG. 12. Note that, the whole flow shown in FIG. 12 shows the operation of CPU 10. In addition, this marking operation can be more understood by referring to the description of FIG. 7 and FIG. 8.

Figure 11:
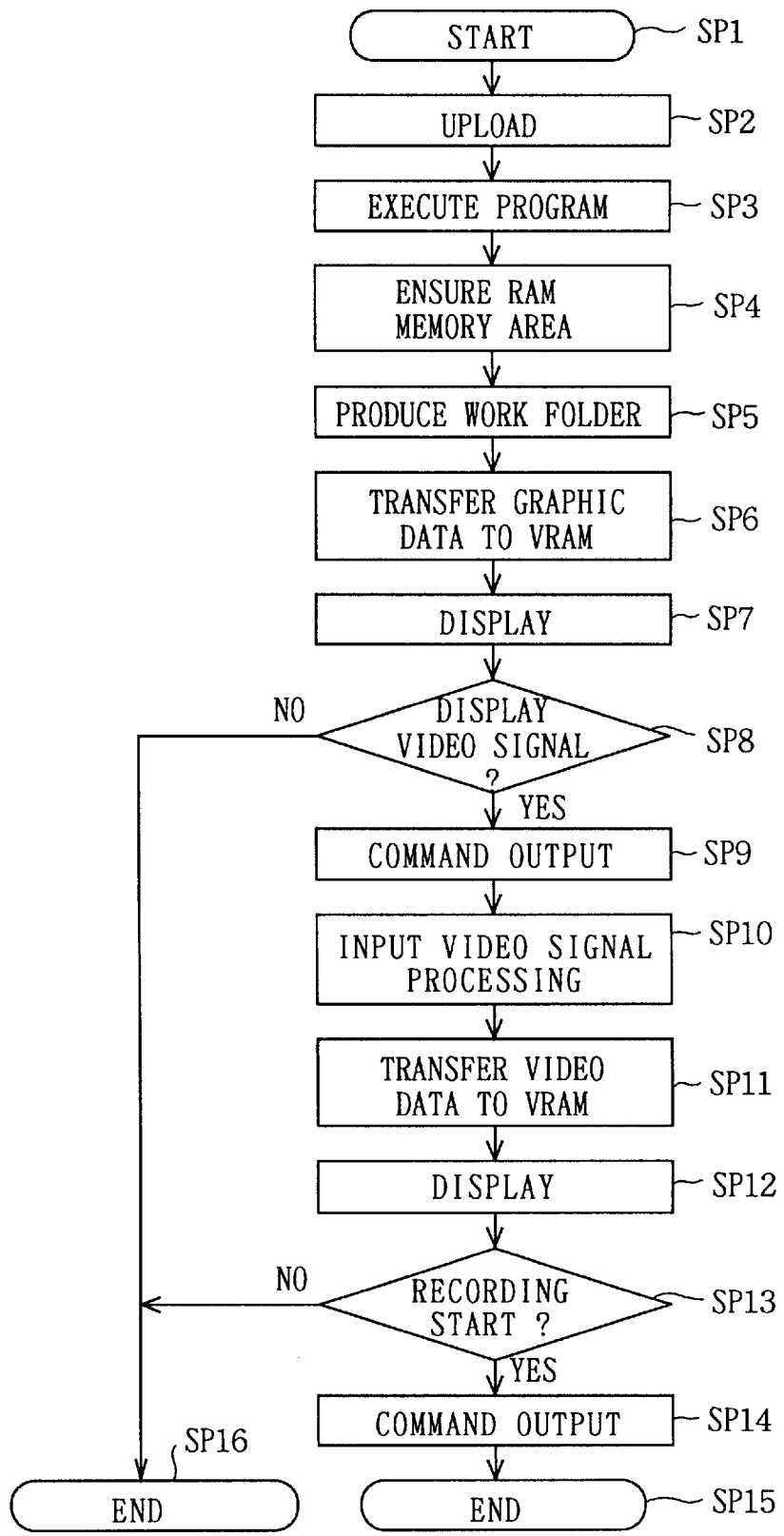
FIG. 11 is a flowchart showing the initial operation of this edition system.

After completing the flow shown in FIG. 11, the CPU 10 judges that this marking operation can be performed and starts step SP20.

At step SP21, it is judged whether marking is newly performed or not. Whether marking is performed or not is judged by whether the mouse was clicked or not in the state where the cursor is positioned in the area of the mark IN button 24c or the mark OUT button 24f. Also, this judgment is judgment by an interrupting command supplied to the CPU 10. If the mark IN button 24c is clicked, the CPU 10 proceeds to step SP22 by judging that the IN point has been assigned. Furthermore, if the mark OUT button 24f is clicked, it proceeds to step SP30 by judging that the OUT point has been assigned.

At step SP22, the clip image data of IN point is formed. This clip image data of IN point is the data formed in reading out to the video data VRAM 13b which has been stored in the frame memory 11c, and it has less sampling rate so that it become the data quantity of 1/16 the video data recorded in the frame memory 11c. Note that, this clip image data is constituted of 95 pixels×60 pixels.

At step SP23, the clip image data which has been stored in the position of the IN clip display area 24a of the VRAM 13b is displayed in the IN clip display area 24a in accordance with the read out of data from the VRAM 13b.

At step SP24, it is judged whether the clip image data of IN point which was marked in step SP21 is the first marking or not. If it is the first marking, the CPU 10 returns to step SP21. If it is the second marking or more, it proceeds to step SP25.

At step SP25, it is judged whether the clip image data previously marked is the clip image data of IN point or not. If the clip image data previously marked is the clip image data of IN point, the CPU 10 proceeds to step SP26, but if the clip image data previously marked is the clip image data of OUT point, it proceeds to step SP27.

At step SP26, the clip image data of IN point which was marked previously is moved to the clip display area 28 from the IN clip display area 24a. That is, this case means that IN point was marked twice successively. As to the second management record data formed at this time, it is good to refer to the description of FIG. 7, FIG. 8 and FIG. 9.

At step SP27, it is judged whether an event is produced or not by the OUT point previously marked. If the event is produced by the previous marking, the CPU 10 proceeds to step SP29, and if the event is produced by the previous marking, it proceeds to step SP28.

At step SP28, the clip image data of OUT point being displayed in the OUT clip display area 24d is moved to the clip display area 28, because it is judged that it is the clip image data which will not be used in production of event of the OUT point previously marked.

At step SP29, the clip image data being displayed in the OUT clip display area 24d is cleared. The clip image data displayed in the OUT clip display area 24d has been registered already as the OUT point of an event, thus it is not needed to move to the clip display area 28.

Returning to step SP21, it will be described about the case where the OUT point was marked in this step SP21. If the OUT point is assigned, the CPU 10 proceeds to step SP30.

At step SP30, the clip image data of OUT point is formed. This clip image data of OUT point is the data formed when read out to the video data VRAM 13b which has been stored in the frame memory 11c, and it has less sampling rate so that it become the data quantity of 1/16. the video data recorded in the frame memory 11c. Note that, this clip image data is constituted of 95 pixels×60 pixels.

At step SP31, the clip image data which has been stored in the position of the OUT clip display area 24d of the VRAM 13b is displayed in the OUT clip display area 24d in accordance with the read out of data from the VRAM 13b.

At step SP32, it is judged whether the clip image data of OUT point which was marked in step SP21 is the first marking or not. If it is the first marking, the CPU 10 returns to step SP21, but if it is the second marking or more, it proceeds to step SP33.

At step SP33, it is judged whether the clip image data previously marked is the clip image data of IN point or not. If the clip image data previously marked is the clip image data of IN point, the CPU 10 proceeds to step SP34, but if the clip image data previously marked is the clip image data of OUT point, it proceeds to step SP36.

At step SP34, registration of event is performed. If the marking of OUT point after IN point is performed as the above, it is automatically registered as an event. As to the description of the second management record data which is formed in connection with the registration of event, it can be well understood by referring to the description of FIG. 7 and FIG. 8.

At step SP35, the clip image data of IN point of the produced event is copied to the event display area 29.

The description of step SP36, step SP37 and step SP38 are omitted because these are similar to step SP27, step SP28 and step SP29.

At step SP39, it is judged whether the marking should be finished or not. This flow shown in FIG. 12 is repeated until the marking is completed.

Description of Second Marking Operation

Figure 13A:
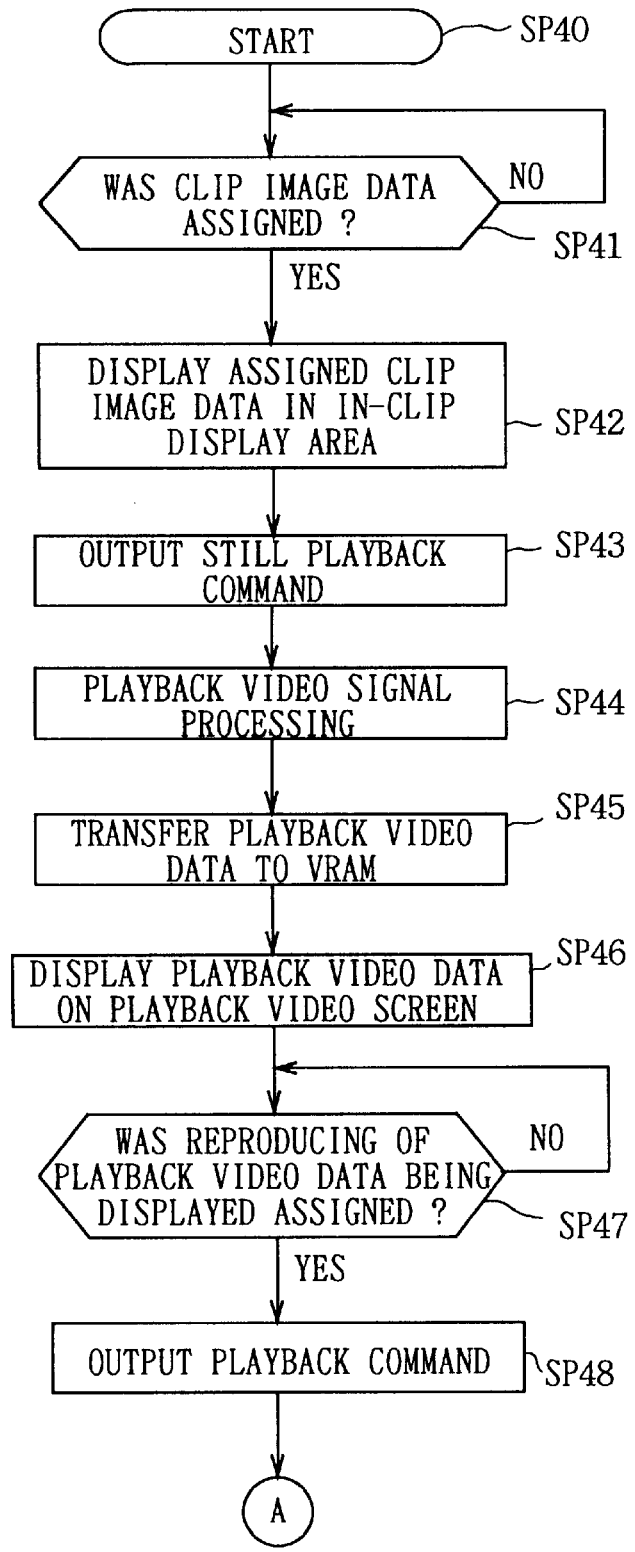
FIGS. 13A and 13B are flowcharts showing the second marking operation of this edition system.
Figure 13B:
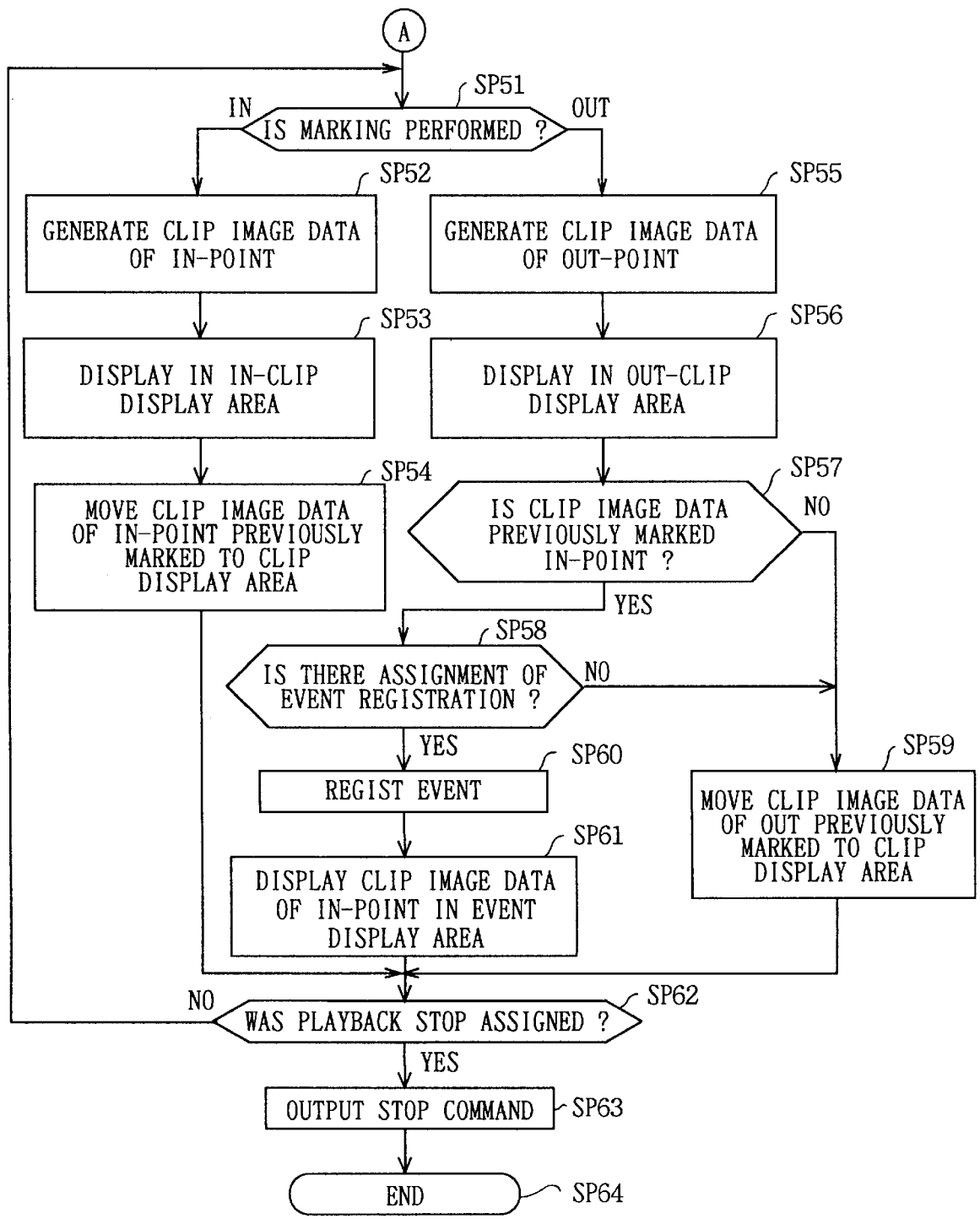

FIG. 13A and FIG. 13B show the flow in producing an event from the video signal reproduced from the hard disk array 2.

This flow is started from the state where the clip image data has been stored already.

At step SP41, it is judged whether the clip image data is assigned or not. On the assignment of clip image data, if the mouse is double-clicked (clicked twice successively) in the state where the cursor is positioned within the display position of the clip image data, the clip image data is assigned.

If the clip image data is assigned and if the assigned clip image data is the clip image data of IN point, it is displayed in the IN clip display area 27a, but if it is the clip image data of OUT point, it is displayed in the OUT clip display area 27d, at step SP42.

At step SP43, the CPU 10 refers to the time code included in the assigned clip image data and outputs a control command to the external interface 18 so that video data of the time code is still-played back. The external interface 18 converts a still playback command to the RS-422 protocol and outputs it to the hard disk array 2. The hard disk array 2 refers to relevant data to the received time code and memory address, thereafter, the video data still-played back is outputted from the hard disk 73 as the second channel video data.

At step SP44, the video data outputted from the hard disk array 2 is received and performed prescribed image processing in the second video processor 12.

At step SP45, the still playback video data stored in the frame memory 12c is transferred to the VRAM 13b so as to be 380 pixels×240 pixels.

At step SP46, the playback video data stored in the VRAM 13b is displayed on the playback video screen 23a. on the playback video screen 23a, only the still image is displayed because the still video data is outputted from the hard disk array 2 not video signal at a real time.

Then at step SP47, it is judged whether the playback is assigned or not with respect to the still video data displayed on the playback video screen 23a. If the PREVIEW button 32 is clicked in the state where the still video data is displayed on the playback video screen 23a, it is judged that playback operation should be started.

At step SP48, a playback start command is outputted to the hard disk array 2 via the external interface 18. The hard disk array 2 receives the playback start command and outputs normal playback video data to the computer 1.

At step SP51, it is judged whether marking is performed or not. Whether marking is performed or not is judged by whether the mouse was clicked or not in the state where the cursor is positioned in the area of the mark IN button 27c or the mark OUT button 27f. Also, this judgment is judgment by the interrupting command supplied to the CPU 10. If the mark IN button 27c is clicked, the CPU 10 proceeds to step SP52 by judging that the IN point is assigned. Furthermore, if the mark OUT button 27f is clicked, it proceeds to step SP55 by judging that OUT point is assigned.

At step SP52, the clip image data of IN point is formed. This clip image data of IN point is the data formed in reading out to the video data VRAM 13b which has been stored in the frame memory 12c, and it has less sampling rate so that it become the data quantity of 1/16 the video data recorded in the frame memory 12c. Note that, this clip image data is constituted of 95 pixels×60 pixels.

At step SP53, the clip image data which has been stored in the position of the IN clip display area 27a of the VRAM 13b is displayed in the IN clip display area 27a in accordance with the read out of data from the VRAM 13b.

At step SP54, the clip image data of IN point which was marked previously and has been displayed in the IN clip display area 27d is moved to the clip display area 28.

At step SP55, the clip image data of OUT point is formed. This clip image data of OUT point is the data formed in reading out to the video data VRAM 13b which has been stored in the frame memory 12e, and it has less sampling rate so that it become the data quantity of 1/16 the video data recorded in the frame memory 12c. Note that, this clip image data is constituted of 95 pixels×60 pixels.

At step SP56, the clip image data which has been stored in the position of the OUT clip display area 27d of the VRAM 13b is displayed in the OUT clip display area 27d in accordance with the read out of data from the VRAM 13b.

At step SP57, it is judged whether the clip image data previously marked is the clip image data of IN point or not. If the clip image data previously marked is the clip image data of IN point, the CPU 10 proceeds to step SP58, but if the clip image data previously marked is the clip image data of OUT point, it proceeds to step SP59.

At step SP58, it is judged whether it should be newly registered as an event. If the "NEW EVENT" button 33 is clicked, it means that it is newly registered as an event. At step SP59, it performs the same processing as step SP28.

At step SP60, registration of event is performed. If the marking of OUT point after IN point is performed and the "NEW EVENT" button 33 is clicked as the above, it is registered as an event. As to the description of the second management record data which is formed in connection with the registration of event, it can be well understood by referring to the description of FIG. 7 and FIG. 8.

At step SP61, the clip image data of IN point of the produced event is copied to the event display area 29.

At step SP62, it is judged that the stop of playback of the video data, displayed on the playback video screen 23a, is assigned. If the stop is assigned, the CPU 10 proceeds to step SP63.

At step SP63, a stop command is outputted to the hard disk array 2 and the processing is terminated.

Industrial Applicability

This invention relates to an edition system. The invention is suitable for, for example, a system for editing a material required to be reported as soon as possible such as sports and news reports. Also, the invention is applicable to a computer graphic system.

I claim:

1. An edition system comprising a main recording and reproducing apparatus and a computer, wherein:

said main recording and reproducing apparatus comprising
  (a) record means for recording source video data which is successively supplied from external equipment at a real time in recording medium means;
  (b) playback means for reproducing the video data which has been recorded in said recording medium means in accordance with a playback command from said computer, while said record means records said source video data in said recording medium means in said real time; and
  (c) output means for outputting the video data same as the source video data recorded in said recording medium means to said computer as first video data, and outputting the video data reproduced by said playback means to said computer as second video data; and said computer comprising:
  (A) user interface means;
  (B) a video processor for receiving said first video data and said second video data, and generating first clip image data showing the IN point or the OUT point of said first video data from said first video data and also second clip image data showing the IN point or the OUT point of said second video data from said second video data;
  (C) display control means for displaying a graphic image concerning said user interface means, said first video data, said second video data, said first clip image data and said second clip image data to a predetermined area of a display means respectively; and
  (D) central control means for controlling said video processor and said display control means according to the operation of said user interface means.

2. The edition system according to claim 1 wherein said central control means generates said playback command controlling the playback means of said main recording and reproducing apparatus according to the operation of said user interface means.

3. The edition system according to claim 1 wherein said central control means controls said processor so that when said IN point or said OUT point is marked by said user interface means, the first clip image data is generated from the first frame of the first video data which is supplied to said computer.

4. The edition system according to claim 1 wherein said central control means enters the edition period from said IN point to said OUT point of said first video data as a first event, and enters the edition period from said IN point to said OUT point of said second video data as a second event.

5. The edition system according to claim 4 wherein said central control means produces an edition program to obtain the video data edited so that said first event obtained from said first video data which has a real time characteristic with respect to the source video data recorded in said main recording and reproducing apparatus and said second event obtained from said second video data which has a non real time characteristic with respect to said source video data are mixed.

6. The edition system according to claim 4 wherein said central control means produces an edition program to obtain the video data edited so that said first event obtained from said first video data recorded in said main recording and reproducing apparatus and said second event reproduced from said main recording and reproducing apparatus and obtained from said second video data are mixed.

7. The edition system according to claim 4 wherein:

said display means includes a record video display area for displaying said first video data, a playback video display area for displaying said second video data, a first IN clip display area for displaying the first clip image data showing said IN point, a first OUT clip display area for displaying the first clip image data showing said OUT point, a second IN clip display area for displaying the second clip image data showing said IN point, and a second OUT clip display area for displaying the second clip image data showing said OUT point; and said central control means controls said video processor so that said first video data is displayed in said record video display area as a moving image and said second video data is displayed in said playback video display area as a moving image.

8. The edition system according to claim 7 wherein said display means further includes a first mark IN button area for marking an IN point in said first video data, a first mark OUT button area for marking an OUT point in said first video data, a second mark IN button area for marking an IN point in said second video data, and a second mark OUT button area for marking an OUT point in said second video data.

9. The edition system according to claim 8 wherein said central control means controls said video processor so that when detecting that said first mark IN button area is assigned by said user interface means, the first clip image data showing said IN point is generated, when detecting that said first mark OUT button area is assigned by said user interface means, the first clip image data showing said OUT point is generated, when detecting that said second mark IN button area is assigned by said user interface means, the second clip image data showing said IN point is generated, and when detecting that said first mark OUT button area is assigned by said user interface means, the second clip image data showing said OUT point is generated.

10. The edition system according to claim 8 wherein
said central control means enters said first event when detecting that said first mark OUT button area is assigned after said first mark IN button area was assigned by said user interface means, and enters said second event when detecting that said second mark OUT button area is assigned after said second mark IN button area was assigned by said user interface means.

11. The edition system according to claim 8 wherein
said central control means enters a plurality of first events by repeating the marking operation in which the marking of said OUT point of said first video data is performed after the marking of said IN point of said first video data, and enters a plurality of second events by repeating the marking operation in which the marking of said OUT point of said second video data is performed after the marking of said IN point of said second video data.

12. The edition system according to claim 8 wherein:
said display means further includes a clip display area for displaying said plurality of clip image data in parallel; and
said central control means controls said display control means so that
the clip image data of IN point or OUT point which is newly marked by said user interface means is displayed in said first IN clip display area, said first OUT clip display area, said second IN clip display area and said second OUT clip display area, and
the clip image data which has been marked temporary before than said newly assigned clip image data in the marking order.

13. The edition system according to claim 8 wherein:
said display means further includes a clip display area for displaying said plurality of clip image data in parallel; and
said central control means controls said display control means so that in the case where the clip image data of IN point or OUT point is newly marked by said user interface means in the state where any clip image data has been displayed in said first IN clip display area, said first OUT clip display area, said second IN clip display area or said second OUT clip display area already, the clip image data displayed in said first IN clip display area, said first OUT clip display area, said second IN clip display area or said second OUT clip display area in said clip display area.

14. The edition system according to claim 13 wherein:
said display means further includes an event display area for displaying the clip image data showing said event in parallel; and
said central control means controls said display control means so that the clip image data of IN point or the clip image data of OUT point, showing said entered event is displayed in said event display area in the entering order of said event.

15. The edition system according to claim 14 wherein:
said display means further includes a program display area for displaying the plurality of clip image data showing said plurality of events in parallel;
said central control means controls said display control means so that the plurality of clip image data displayed in said event display area are rearranged so as to be a desired order, and thus rearranged clip image data are displayed in said program display area; and
said central control means produces an edition program for editing said plurality of events in accordance with the display order in said program display area of said rearranged clip image data.

16. The edition system according to claim 15 wherein:
said central control means displays said rearranged clip image data in said program display area by repeating the operation that selects a desired clip image data from the plurality of clip image data displayed in said event display area by operating a pointing device arranged in said user interface means, and copies thus selected clip image data to a desired display position in said program display area, for each unit of said desired clip image data.

17. The edition system according to claim 15 wherein:
said edition program is a program to obtain the video data edited so that said first event and said second event are mixed, in accordance with the display order of the plurality of clip image data displayed in said program display area, without regard to that the plurality of clip image data displayed in said program display area are said first clip image data obtained from said first video data or said second clip image data obtained from said second video data.

18. The edition system according to claim 7 wherein
said display means includes a clip display area for displaying said clip image data in parallel, an event display area for displaying the clip image data showing said event in parallel, and a program display area for displaying the clip image data showing said event which has been rearranged so as to be in a desired display order.

19. The edition system according to claim 18 wherein:
said video processor includes time code extract means for extracting first time code data from said first video data supplied from said main recording and reproducing apparatus and extracting second time code data from said second video data supplied from said main recording and reproducing apparatus; and
said central control device controls said display control means so that said first time code data is displayed corresponding to the first video data that is displayed in said record video display area as a moving image, and said second time code data is displayed corresponding to the second video data that is displayed in said playback video display area as a moving image.

20. The edition system according to claim 19 wherein
said central control means controls said display control means so that said first time code data corresponding to the clip image data displayed in said first IN clip display area and the clip image data displayed in said first OUT clip display area are displayed respectively, and also said second time code data corresponding to the clip image data displayed in said second IN clip display area and the clip image data displayed in said second OUT clip display area are displayed respectively.

21. The edition system according to claim 19 wherein
said central control means controls said display control means so that said first time code data corresponding to the first clip image data displayed in said clip display area, said event display area and said program display area, and said second time code data corresponding to the second clip image data displayed in said clip display area, said event display area and said program display area are displayed respectively.

22. The edition system according to claim 18 wherein
said central control means adds a serial index number to said clip image data in the generation order of said clip image data without regard to that said generated clip image data is said first clip image data or said second clip image data.

23. The edition system according to claim 22 wherein
said central control device controls said display control means so that said index number added to the clip image data displayed in said clip display area is displayed respectively.

24. The edition system according to claim 22 wherein
said central control means adds a serial event number to said clip image data in the entering order of said event without regard to that said entered event is said first event or said second event.

25. The edition system according to claim 24 wherein
said central control device controls said display control means so that said event number added to the event shown by the clip image data which is displayed in said event display area and said program display area is displayed respectively.

26. The edition system according to claim 18 wherein
said central control means adds the clip type data showing IN point to the clip image data marked as said IN point and also adds the clip type data showing OUT point to the clip image data marked as said OUT point.

27. The edition system according to claim 26 wherein
said central control means controls said display control means so that the character showing IN point or the character showing OUT point is displayed on the basis of said clip type data which is added to the clip image data displayed in said clip display area, said event display area and said program display area.

28. The edition system according to claim 18 wherein
said central control means includes memory means for storing said first clip image data and said second clip image data which are generated by said video processor, the data relating to said entered first event, and the data relating to said entered second event.

29. The edition system according to claim 28 wherein
said central control means makes said memory means store management record data for clip data for managing the clip image data which is displayed in said clip display area, management record data for event data for managing the clip image data which is displayed in said event display area, and management record data for program data for managing the clip image data which is displayed in said program display area.

30. The edition system according to claim 29 wherein:
said management record data for clip data is constituted of a plurality of second management record data for clip data for managing the first management record data for clip data for managing the entire clip display area, and the clip image data which is displayed in said clip display area in each unit of clip image data;
said management record data for event data is constituted of a plurality of second management record data for event data for managing the first management record data for event data for managing the entire event display area, and the clip image data which is displayed in said event display area in each unit of clip image data; and
said management record data for program data is constituted of a plurality of second management record data for program data for managing the first management record data for program data for managing the entire program display area, and the clip image data which is displayed in said program display area in each unit of clip image data.

31. The edition system according to claim 30 wherein:
said central control means, in the case where the display order of the clip image data displayed in said clip display area is changed, said second management record data for clip data is changed without changing the storing position of said clip image data in said memory;
said central control means, in the case where the display order of the clip image data displayed in said event display area is changed, said second management record data for event data is changed without changing the storing position of the clip image data displayed in said event display area in said memory; and
said central control means, in the case where the display order of the clip image data displayed in said program display area is changed, said second management record data for program data is changed without changing the storing position of the clip image data displayed in said program display area in said memory.

32. The edition system according to claim 30 wherein:
said central control means manages all of the clip image data to be displayed in said clip display area by utilizing the link structure in which said second management record data for clip data is linked to said first management record data for clip data;
said central control means manages all of the clip image data to be displayed in said event display area by utilizing the link structure in which said second management record data for event data is linked to said first management record data for event data; and
said central control means manages all of the clip image data to be displayed in said program display area by utilizing the link structure in which said second management record data for program data is linked to said first management record data for program data.

33. The edition system according to claim 32 wherein
said first management record data for clip data includes the number of links data which shows the number of said second management record data for clip data linked to said first management record data for clip data.

34. The edition system according to claim 32 wherein:
said first management record data for clip data includes the pointer data for assigning the storing position of said second management record data for clip data, linked to said first management record data for clip data, in said memory means; and
the second management record data for clip data which is linked to said first management record data for clip data includes the handle data for assigning the storing position of the clip image data which is displayed in said clip image display area at first in said memory means.

35. The edition system according to claim 34 wherein
said second management record data for clip data linked to said first management record data for clip data further includes the pointer data for assigning the storing position of second management record data for clip data which manages the clip image data displayed following said clip image data displayed in said clip image display area at first.

36. The edition system according to claim 32 wherein the Nth second management record data for clip data for managing the clip image data displayed at Nth in said clip display area ("N" is the value of integer larger than "2") includes that:

the pointer data for assigning the storing position of the second management record data for clip data which is linked to said first management record data for clip data at N−1$^{st}$, in said memory means;

the pointer data for assigning the storing position of the second management record data for clip data which is linked to said first management record data for clip data at N+1$^{st}$, in said memory means; and the handle data for assigning the storing position of said clip image data displayed at Nth, in said memory means.

37. The edition system according to claim 32 wherein:

said first management record data for event data includes the pointer data for assigning the storing position of said second management record data for event data which is linked to said first management record data for event data; and the second management record data for event data linked to said first management record data for event data includes the handle data of IN point and the handle data of OUT point for assigning the storing position of the clip image data of said IN point and the clip image data of said OUT point, of said event entered at first, in said memory means.

38. The edition system according to claim 37 wherein said second management record data for event data linked to said first management record data for event data further includes the pointer data for assigning the storing position of the second management record data for event data for managing the event which is entered following said event entered at first.

39. The edition system according to claim 32 wherein the Nth second management record data for event data for managing the event data assigned by the clip image data displayed at Nth in said event display area ("N" is the value of integer larger than "2") includes that:

the pointer data for assigning the storing position of the second management record data for event data which is linked to said first management record data for event data at N−1$^{st}$, in said memory means;

the pointer data for assigning the storing position of the second management record data for event data which is linked to said first management record data for event data at N+1$^{st}$, in said memory means; and the handle data of IN point and the handle data of OUT point showing the storing positions of the clip image data of IN point and the clip image data of OUT point relating to the Nth event shown by said clip image data displayed at Nth, respectively.

40. The edition system according to claim 32 wherein:

said first management record data for program data includes the pointer data for assigning the storing position of said second management record data for event data which is linked to said first management record data for program data; and the second management record data for event data linked to said first management record data for event data includes the handle data of IN point and the handle data of OUT point for assigning the storing positions of the clip image data of IN point and the clip image data of OUT point, relating to the event which is entered as the first event of the edition program.

41. The edition system according to claim 40 wherein the event managed by said second management record data for program data coincides with any one of the events managed by said second management record data for event data.

42. The edition system according to claim 40 wherein said handle data of IN point and said handle data of OUT point, of said second management record data for program data are coincide with any one of the handle data of IN point and the handle data of OUT point, of said second management record data for event data.

43. The edition system according to claim 40 wherein the second management record data for event data linked to said first management record data for program data further includes the pointer data for assigning the storing position of the second management record data for program data for managing said event which is assigned for the next event to the first event of said edition program.

44. The edition system according to claim 40 wherein the event shown by the clip image data displayed at Nth in said program display area ("N" is the value of integer larger than "2") is an event to be assigned for the Nth event of said edition program.

45. The edition system according to claim 44 wherein said Nth event is managed by the Nth second management record data for program data which is linked to said first management record data for program data at Nth.

46. The edition system according to claim 40 wherein said central control means produces said edition program in accordance with the link state of the plurality of second management record data for program data for managing a plurality of events shown by the plurality of clip image data displayed in said program display area in each unit of event.

47. The edition system according to claim 40 wherein the Nth second management record data for program data linked to said first management record data for program data at Nth includes that:

preceding linked pointer data for assigning the storing position of the second management record data for program data which manages the event assigned for the N−1$^{st}$ event of said edition program;

following linked pointer data for assigning the storing position of the second management record data for program data which manages the event assigned for the N+1$^{st}$ event of said edition program; and the handle data of IN point and the handle data of OUT point showing the storing position of the clip image data of IN point and the clip image data of OUT point relating to the event assigned for the Nth event of said edition program.

48. The edition system according to claim 47 wherein said central control means controls said display control means so that any one of the clip image data displayed in said event display area is assigned by said user interface means and the assigned event is copied and displayed in said program display area; and said central control means generates the second management record data for program data including the same handle data of IN point and the handle data of OUT point as that the handle data of IN point and the handle data of OUT point included in said second management record data for event data for managing said assigned clip image data, in order to manage the event shown by the clip image data copied and displayed in said program display area.

49. The edition system according to claim 47 wherein said central control means rewrites said preceding linked pointer data and said following linked pointer data without changing the storing positions of the clip data of said IN point and the clip image data of said OUT point in said memory and rewriting the handle data of IN point and said handle data of OUT point, these are stored in said second management record data for program data, to change the link state of said second management record data for program data so that the order of the events entered in said edition program is changed.

50. The edition system according to claim 40 wherein said second management record data for clip data, said second management record data for event data and said second management record data for program data includes the time code data showing the time code which corresponds to the clip image data managed by said each management record data respectively.

51. The edition system according to claim 50 wherein said central control means controls said display control means so as to display the time code corresponding to each clip image data, displayed in said clip display area, said event display area and said program display area, on the basis of said time code data, of said second management record data for clip data, said second management record data for event data and said second management record data for program data, stored in said memory means.

52. The edition system according to claim 40 wherein said central control means produces said edition program based on the time code data stored in said second management record data for program data which manages the event shown by the plurality of clip image data displayed in said program display area.

53. The edition system according to claim 32 wherein said central control means stores the serial index number which is added in the generation order of said clip image data as the index number data of said second management record data for clip data for managing said clip image data displayed in said clip display area.

54. The edition system according to claim 53 wherein said central control means displays the index number added to the clip image data displayed in said clip display area on the basis of said index number data of said second management record data for clip data stored in said memory means.

55. The edition system according to claim 31 wherein said central control means stores a clip type showing that said clip image data is the clip image data of IN point or the clip image data of OUT point as the clip type data of said second management record data for clip data.

56. The edition system according to claim 55 wherein said central control means displays the clip type of the clip image data displayed in said clip display area on the basis of said clip type data of said second management record data for clip data stored in said memory means.

57. The edition system according to claim 30 wherein said central control means controls said display control means so that each clip image data is displayed in said clip display area, said event display area and said program display area on the basis of said first management record data for clip data, said second management record data for clip data, said first management record data for event data, said second management record data for event data, said first management record data for program data, and said second management record data for program data, these are stored in said memory means.

58. The edition system according to claim 30 wherein said second management record data for clip data includes the time code data which shows the time code of each clip image data displayed in said clip display area.

59. The edition system according to claim 58 wherein:
if the clip image data displayed in said clip display area is assigned by the operation of said user interface means, said central control means of said computer supplies a playback command based on said time code data of said second management record data for clip data stored in said memory means to said main recording and reproducing means;

said main recording and reproducing means wherein said playback means starts to reproduce video data from a time code position on the basis of said time code data, responding to said playback command supplied from said computer, and said output means outputs thus reproduced video data reproduced to said computer as second video data; and the central control means of said computer controls said display control means so that said second video data is displayed in said playback video display area as a moving image.

60. The edition system according to claim 58 wherein the central control means of said computer controls said display control means so that said assigned clip image data stored in said memory means is read out on the basis of the second management record data for clip data for managing said assigned clip image data stored in said memory means and displayed in said second IN clip display area or said second OUT clip display area.

61. The edition system according to claim 58 wherein if said central control means of said computer detects that the clip image data displayed in said clip display area is assigned by the operation of said user interface means, said central control means of said computer outputs a playback command to said main recording and reproducing means so that video data is reproduced from the time code position where said assigned clip image data has been recorded, on the basis of said time code data of said second management record data for clip data for managing said assigned clip image data stored in said memory means.

62. The edition system according to claim 1 wherein said main recording and reproducing means includes a plurality of disk arrays for recording of source video data and a plurality of disk arrays for recording of audio data.

63. The edition system according to claim 1 wherein said main recording and reproducing means further includes first buffering means for temporarily buffering said source video data, second buffering means for temporarily buffering the video data reproduced by said playback means, and a system controller for controlling said record means, said playback means, said output means, said first buffering means, and said second buffering means by receiving the control command from said computer.

64. The edition system according to claim 63 wherein said system controller includes memory means for relating the time code data added to said first video data with a record address of said source video data and storing them.

65. The edition system according to claim 63 wherein said system controller controls said playback means by referring the time code data corresponding to the playback command supplied from said computer and an address of the time code data stored in the memory means of said system controller.

66. The edition system according to claim 63 wherein said system controller controls said first buffering means and said second buffering means so that the source video data which has been recorded already is reproduced from said recording medium means while recording said source video in said recording medium means.

67. The edition system according to claim 63 wherein said system controller controls said first buffering means and said second buffering means so as to seem to be that the recording of said source video in said recording medium means and the playback from said recording medium means are performed simultaneously in view from said computer.

68. A computer system for assigning a desired edition period with respect to source video data supplied from external equipment, said computer system being usable with a recording device for recording video data in real time and a reproducing device for reproducing recorded video data while said recording device records the video data in said real time, said system comprising:

(A) user interface means;

(B) a video processor for generating clip image data showing IN point or OUT point of the source video data from said source video data;

(C) display means for displaying a graphic image relating to said user interface means and said source video data as moving images, and also displaying said clip image data as a static image;

(D) memory means for storing said clip image data, and also storing the management record data for storing the display position in said display means of said clip image data; and (E) central control means for controlling said video processor so that said clip image data is generated from said source video data at the timing of that said IN point or said OUT point is marked by said user interface means in the state where said video data is displayed on said display means as a moving image, and also controlling said display means so that said generated clip image data is displayed at a predetermined position of said display means on the basis of a management record data of said memory means.

69. The computer system according to claim 68 wherein said central control means enters the edition period from the IN point of said source video data to the OUT point of said source video data, the edition period is assigned by said user interface, as an event.

70. The computer system according to claim 69 wherein said central control means enters said plurality of events by repeating the marking operation in which the marking of OUT point of said source video data is performed after the marking of IN point of said source video data.

71. The computer system according to claim 69 wherein said display means includes that: a video display area for displaying said source video data; an IN clip display area for displaying the clip image data of said IN point; an OUT clip display area for displaying the clip image data of said OUT point; a clip display area for displaying said clip image data in parallel; an event display area for displaying the clip image data showing said entered event in parallel; and a program display area for displaying the clip image data showing said event which is rearranged in parallel so as to be in desired display order.

72. The computer system according to claim 71 wherein:
said central control means controls said display means so that the clip image data of IN point or the clip image data of OUT point newly marked by said user interface is displayed in said IN clip display area and said OUT clip display area, and clip image data marked temporarily before than said newly marked clip image data is displayed in the marking order.

73. The computer system according to claim 71 wherein said central control means controls said display control means so that the clip image data of IN point or the clip image data of OUT point showing said entered event is displayed in said event display area.

74. The computer system according to claim 71 wherein said central control means controls said display means so that the clip image data in which a plurality of clip image data displayed in said event display area are rearranged so as to be in desired order, is displayed in said program display area.

75. The computer system according to claim 71 wherein said central control means displays said rearranged clip image data in said program display area by repeating the operation that selects a desired clip image data from the plurality of clip image data displayed in said event display area by operating a pointing device arranged in said user interface means, and copies thus selected clip image data to a desired display position in said program display area, in each unit of said desired clip image data.

76. The computer system according to claim 71 wherein said management record data is composed of that: management record data for clip data for managing the clip image data displayed in said clip display area; management record data for event data for managing the clip image data to be displayed in said event display area; and management record data for program data for managing the clip image data to be displayed in said program display area.

77. The computer system according to claim 76 wherein:
said management record data for clip data is constituted of a plurality of second management record data for clip data for managing the first management record data for clip data for managing the entire clip display area, and the clip image data which is displayed in said clip display area in each unit of clip image data;

said management record data for event data is constituted of a plurality of second management record data for event data for managing the first management record data for event data for managing the entire event display area, and the clip image data which is displayed in said event display area in each unit of clip image data; and said management record data for program data is constituted of a plurality of second management record data for program data for managing the first management record data for program data for managing the entire program display area, and the clip image data which is displayed in said program display area in each unit of clip image data.

78. The computer system according to claim 77 wherein:

in the case where the display order of the clip image data displayed in said clip display area is changed, said central control means changes said second management record data for clip data without changing the storing position of said clip image data in said memory;

in the case where the display order of the clip image data displayed in said event display area is changed, said central control means changes said second management record data for event data is changed without changing the storing position of the clip image data displayed in said event display area in said memory; and in the case where the display order of the clip image data displayed in said program display area is changed, said central control means changes said second management record data for program data is changed without changing the storing position of the clip image data displayed in said program display area in said memory.

79. The computer system according to claim 77 wherein said central control means manages all of the clip image data to be displayed in said clip display area by utilizing the link structure in which said second management record data for clip data is linked to said first management record data for clip data;

said central control means manages all of the clip image data to be displayed in said event display area by utilizing the link structure in which said second management record data for event data is linked to said first management record data for event data; and said central control means manages all of the clip image data to be displayed in said program display area by utilizing the link structure in which said second management record data for program data is linked to said first management record data for program data.

80. The computer system according to claim 79 wherein:

said first management record data for clip data includes the pointer data for assigning the storing position of said second management record data for clip data, linked to said first management record data for clip data, in said memory means; and the second management record data for clip data which is linked to said first management record data for clip data includes the handle data for assigning the storing position of the clip image data displayed in said clip image display area at first in said memory means.

81. The computer system according to claim 80 wherein said second management record data for clip data linked to said first management record data for clip data further includes the pointer data for assigning the storing position of the second management record data for clip data which manages the clip image data displayed following said clip image data displayed in said clip image display area at first.

82. The computer system according to claim 81 wherein the Nth second management record data for clip data for managing the clip image data displayed at Nth in said clip display area ("N" is the value of integer larger than "2") includes that:

the pointer data for assigning the storing position of the second management record data for clip data which is linked to said first management record data for clip data at N−$1^{st}$ in said memory means;

the pointer data for assigning the storing position of the second management record data for clip data which is linked to said first management record data for clip data at N+$1^{st}$ in said memory means; and the handle data for assigning the storing position of said clip image data displayed at Nth in said memory means.

83. The computer system according to claim 79 wherein:

said first management record data for event data includes the pointer data for assigning the storing position of said second management record data for event data which is linked to said first management record data for event data; and the second management record data for event data linked to said first management record data for event data includes the handle data of IN point and the handle data of OUT point for assigning the storing positions of the clip image data of said IN point and the clip image data of said OUT point, of said event entered at first, in said memory means.

84. The computer system according to claim 83 wherein said second management record data for event data linked to said first management record data for event data further includes the pointer data for assigning the storing position of the second management record data for event data for managing the event which is entered following said event entered at first.

85. The computer system according to claim 84 wherein the Nth second management record data for event data for managing the event data assigned by the clip image data displayed at Nth in said event display area ("N" is the value of integer larger than "2") includes that:

the pointer data for assigning the storing position of the second management record data for event data which is linked to said first management record data for event data at N−$1^{st}$ in said memory means;

the pointer data for assigning the storing position of the second management record data for event data which is linked to said first management record data for event data at N+$1^{st}$ in said memory means; and the handle data of IN point and the handle data of OUT point showing the storing positions of the clip image data of IN point and the clip image data of OUT point relating to the Nth event shown by said clip image data displayed at Nth, respectively.

86. The computer system according to claim 79 wherein:

said first management record data for program data includes the pointer data for assigning the storing position of said second management record data for event data which is linked to said first management record data for program data; and the second management record data for event data linked to said first management record data for event data includes the handle data of IN point and the handle data of OUT point for assigning the storing positions of the clip image data of IN point and the clip image data of OUT point, relating to the event which is assigned for the first event of an edition program.

87. The computer system according to claim 86 wherein the event managed by said second management record data for program data coincides with any one of the events managed by said second management record data for event data.

88. The computer system according to claim 86 wherein the handle data of said IN point and the handle data of said OUT point, of said second management record data for program data are coincide with any one of the handle data of IN point and the handle data of OUT point, of said second management record day for event data.

89. The computer system according to claim 86 wherein the second management record data for event data linked to said first management record data for program data further includes the pointer data for assigning the storing position of the second management record data for program data for managing said event which is assigned for the next event to the first event of said edition program.

90. The computer system according to claim 89 wherein the event shown by the clip image data displayed at Nth in said program display area ("N" is the value of integer larger than "2") is an event to be assigned for the Nth event of said edition program.

91. The computer system according to claim 90 wherein said Nth event is managed by the Nth second management record data for program data which is linked to said first management record data for program data at Nth.

92. The computer system according to claim 86 wherein said central control means produces said edition program in accordance with the link state of the plurality of second management record data for program data for managing a plurality of events shown by the plurality of clip image data displayed in said program display area in each unit of event.

93. The computer system according to claim 92 wherein the Nth second management record data for program data linked to said first management record data for program data at Nth includes that:

preceding linked pointer data for assigning the storing position of the second management record data for program data which manages the event assigned for the $N-1^{st}$ event of said edition program;

following linked pointer data for assigning the storing position of the second management record data for program data which manages the event assigned for the $N+1^{st}$ event of said edition program; and the handle data of IN point and the handle data of OUT point showing the storing positions of the clip image data of IN point and the clip image data of OUT point relating to the event assigned for the Nth event of said edition program.

94. The computer system according to claim 93 wherein said central control means controls said display means so that any one of the clip image data displayed in said event display area is assigned by said user interface means and the assigned event is copied and displayed in said program display area; and said central control means generates the second management record data for program data including the same handle data of IN point and the handle data of OUT point as that the handle data of IN point and the handle data of OUT point included in said second management record data for event data for managing said assigned clip image data, in order to manage the event shown by the clip image data copied and displayed in said program display area.

95. The computer system according to claim 93 wherein said central control means rewrites said preceding linked pointer data and said following linked pointer data without changing the storing positions of the clip data of said IN point and the clip image data of said OUT point in said memory and rewriting the handle data of said IN point and the handle data of said OUT point, these are stored in said second management record data for program data, to change the link state of said second management record data for program data so that the order of the events entered in said edition program is changed.

96. The computer system according to claim 79 wherein said second management record data for clip data, said second management record data for event data and said second management record data for program data include the time code data showing the time code which corresponds to the clip image data managed by said each management record data respectively.

97. The computer system according to claim 96 wherein said central control means controls said display means so as to display the time code corresponding to each clip image data, displayed in said clip display area, said event display area and said program display area, on the basis of said time code data, of said second management record data for clip data, said second management record data for event data and said second management record data for program data, stored in said memory means.

98. The computer system according to claim 79 wherein said central control means stores the serial index number which is added in the generation order of said clip image data as the index number data of said second management record data for clip data for managing said clip image data displayed in said clip display area.

99. The computer system according to claim 98 wherein said central control means displays the index number added to the clip image data displayed in said clip display area on the basis of said index number data of said second management record data for clip data stored in said memory means.

100. The computer system according to claim 76 wherein:

the management record data for clip data for managing the clip image data displayed in said clip display area includes the time code data showing the time code at the time when said clip image data is marked; and when the clip image data displayed in said clip display area is assigned, said central control means generates a predetermined playback command on the basis of the time code data of said management record data for clip data.

101. A display management device for displaying supplied source video data and clip image data showing an IN point and an OUT point which are marked with respect to said source video data, said display management device being usable with a recording device for recording video data in real time and a reproducing device for reproducing recorded video data while said recording device records the video data in said real time, said display management device having:

an area for displaying a graphic image for user interface;

a video display area for displaying said source video data as a moving image at a real time;

an IN clip display area for displaying the clip image data showing an IN point newly marked;

an OUT clip display area for displaying the clip image data showing an OUT point newly marked;

a clip display area for displaying the clip image data which has been marked temporarily before than said newly marked IN point or OUT point, in accordance with the marking order;

an event display area for displaying the clip image data of IN point or the clip image data of OUT point showing an event which is entered by marking said IN point and said OUT point; and a program display area for displaying the clip image data of IN point or the clip image data of OUT point showing said event, rearranged so as to be in desired display order.

102. The display management device according to claim 101 including memory means for storing that: the management record data for clip data for managing the clip image data displayed in said clip display area; the management record data for event data for managing the clip image data displayed in said event display area; and the management record data for program data for managing the clip image data displayed in said program display area.

103. The display management device according to claim 102 wherein said management record data for clip data is constituted of a plurality of second management record data for clip data for managing the first management record data for clip data for managing the entire clip display area, and the clip image data which is displayed in said clip display area in each unit of clip image data;

said management record data for event data is constituted of a plurality of second management record data for event data for managing the first management record data for event data for managing the entire event display area, and the clip image data which is displayed in said event display area in each unit of clip image data; and said management record data for program data is constituted of a plurality of second management record data for program data for managing the first management record data for program data for managing the entire program display area, and the clip image data which is displayed in said program display area in each unit of clip image data.

104. The display management device according to claim 103 wherein in the case where the display order of the clip image data displayed in said clip display area is changed, said display management device changes said second management record data for clip data without changing the storing position of said clip image data in said memory;

in the case where the display order of the clip image data displayed in said event display area is changed, said display management device changes said second management record data for event data without changing the storing position of the clip image data displayed in said event display area in said memory; and in the case where the display order of the clip image data displayed in said program display area is changed, said display management device changes said second management record data for program data without changing the storing position of the clip image data displayed in said program display area in said memory.

105. The display management device according to claim 103 wherein said display management device manages all of the clip image data to be displayed in said clip display area by utilizing the link structure in which said second management record data for clip data is linked to said first management record data for clip data;

said display management device manages all of the clip image data to be displayed in said event display area by utilizing the link structure in which said second management record data for event data is linked to said first management record data for event data; and said display management device manages all of the clip image data to be displayed in said program display area by utilizing the link structure in which said second management record data for program data is linked to said first management record data for program data.

106. The display management device according to claim 105 wherein said first management record data for clip data includes the pointer data for assigning the storing position of said second management record data for clip data, linked to said first management record data for clip data, in said memory means; and the second management record data for clip data which is linked to said first management record data for clip data includes the handle data for assigning the storing position of the clip image data which is displayed in said clip image display area at first in said memory means.

107. The display management device according to claim 106 wherein said second management record data for clip data linked to said first management record data for clip data further includes the pointer data for assigning the storing position of the second management record data for clip data which manages the clip image data displayed following the clip image data displayed in said clip image display area at first.

108. The display management device according to claim 107 wherein the Nth second management record data for clip data for managing the clip image data displayed at Nth in said clip display area ("N" is the value of integer larger than "2") includes that:

the pointer data for assigning the storing position of the second management record data for clip data which is linked to said first management record data for clip data at $N-1^{st}$, in said memory means;

the pointer data for assigning the storing position of the second management record data for clip data which is linked to said first management record data for clip data at $N+1^{st}$, in said memory means; and the handle data for assigning the storing position of the clip image data displayed at said Nth, in said memory means.

109. A data display method of displaying supplied source video data and the clip image data showing an IN point and an OUT point which are marked with respect to said source video data on a computer display, said method being usable with a recording device for recording video data in real time and a reproducing device for reproducing recorded video data while said recording device records the video data in said real time, said method comprising:

(a) the step of displaying a graphic image for user interface, and also displaying said source video data in the video display area on said computer display as a moving image;

(b) the step of displaying the clip image data showing an IN point newly marked in an IN clip display area of said computer display;

the step of displaying the clip image data showing an OUT point newly marked in an OUT clip display area of said computer display;

(c) the step of displaying the clip image data which has been marked temporarily before than said newly marked IN point or OUT point in the clip display area of said computer display in accordance with the marking order;

(d) the step of displaying the clip image data of IN point or the clip image data of OUT point showing an event which is entered by marking said IN point and said OUT point in the entering order of said events; and (e) the step of displaying the clip image data of IN point or the clip image data of OUT point showing said event which is rearranged so as to be in desired display order in a program display area of said computer display.

110. A clip image data display method of displaying the clip image data showing an edition point at which marking is performed with respect to video data on a display screen, said method being usable with a recording device for recording video data in real time and a reproducing device for reproducing recorded video data while said recording device records the video data in said real time, said method comprising:

(a) the step of displaying a graphic image for user interface on said display screen, and also displaying the video data supplied to said computer at a predetermined display position as a moving image at a real time;

(b) the step of generating the clip image data showing IN point and the clip image data showing OUT point from said video data responding to information inputted via said user interface;

(c) the step of entering an event showing an edition period which is composed of said IN point and said OUT point; and (d) the step of displaying the clip image data of said IN point or the clip image data of said OUT point used in entering said event in an event display area as the clip image data showing said entered event, and also displaying the clip image data of said IN point or the clip image data of said OUT point not used in entering said event in a clip display area.

* * * * *